US008121544B2

(12) United States Patent
Shimizu et al.

(10) Patent No.: US 8,121,544 B2
(45) Date of Patent: Feb. 21, 2012

(54) COMMUNICATION SYSTEM USING TRANSMIT/RECEIVE SLOT ANTENNAS FOR NEAR FIELD ELECTROMAGNETIC COUPLING OF DATA THEREBETWEEN

(75) Inventors: Tatsuo Shimizu, Chiba (JP); Takeyuki Fujii, Tokyo (JP); Satoru Ooshima, Tokyo (JP); Hidenobu Kakioka, Fukuoka (JP); Katsunori Ishii, Chiba (JP)

(73) Assignee: Sony Corporation, Tokyo (JP)

( * ) Notice: Subject to any disclaimer, the term of this patent is extended or adjusted under 35 U.S.C. 154(b) by 255 days.

(21) Appl. No.: 12/427,246

(22) Filed: Apr. 21, 2009

(65) Prior Publication Data

US 2009/0273418 A1 Nov. 5, 2009

(30) Foreign Application Priority Data

Apr. 30, 2008 (JP) ................................ 2008-118412

(51) Int. Cl.
*H04B 5/00* (2006.01)
*H01Q 13/10* (2006.01)

(52) U.S. Cl. ....... 455/41.1; 343/756; 343/767; 343/769; 333/21 A

(58) Field of Classification Search .................. 343/756, 343/767, 769; 333/21 A; 455/41.1
See application file for complete search history.

(56) References Cited

U.S. PATENT DOCUMENTS

| | | | | |
|---|---|---|---|---|
| 3,665,480 | A * | 5/1972 | Fassett | 343/754 |
| 5,437,057 | A * | 7/1995 | Richley et al. | 455/41.1 |
| 5,714,961 | A * | 2/1998 | Kot et al. | 343/769 |
| 2005/0190112 | A1* | 9/2005 | Thudor et al. | 343/767 |
| 2006/0033671 | A1* | 2/2006 | Chan et al. | 343/769 |
| 2007/0289772 | A1 | 12/2007 | Kuroda et al. | |
| 2008/0074337 | A1* | 3/2008 | Manholm et al. | 343/769 |

FOREIGN PATENT DOCUMENTS

JP 2005-228981 8/2005

OTHER PUBLICATIONS

John Wilson et al., “AC Coupled Interconnect using Buried Bumps for Laminated Organic Packages”, 2006 Electronic Components and Technology Conference, pp. 41-48.

Lei Luo et al., “A 36Gb/s ACCI Multi-Channel Bus using a Fully Differential Pulse Receiver”, IEEE 2006 Custom Intergrated Circuits Conference (CICC), pp. 773-776.

Noriyuki Miura et al., “A 195-Gb/s 1.2-W Inductive Inter-Chip Wireless Superconnect With Transmit Power Control Scheme for 3-D-Stacked System in a Package”, IEEE Journal of Solid-State Circuits, vol. 41, No. 1, Jan. 2006, pp. 23-34.

Jian Xu et al., “2.8Gb/s Inductively Coupled Interconnect for 3-D ICs”, 2005 Symposium on VLSI Circuit Digest of Technical Papers, pp. 352-355.

* cited by examiner

*Primary Examiner* — Benny Lee
(74) *Attorney, Agent, or Firm* — Oblon, Spivak, McClelland, Maier & Neustadt, L.L.P.

(57) ABSTRACT

An antenna apparatus for use in a transmitter or a receiver in a communication system. The antenna apparatus includes: a dielectric substrate having a conductor layer on one of surfaces; and a slot antenna including an antenna electrode formed on the one surface and disposed substantially at the center, a grounded conductive surface surrounding the antenna electrode, and a slot transmission line made by a gap between the antenna electrode and the grounded conductive surface.

16 Claims, 22 Drawing Sheets

COMMUNICATION SYSTEM USING TRANSMIT/RECEIVE SLOT ANTENNAS FOR NEAR FIELD ELECTROMAGNETIC COUPLING OF DATA THEREBETWEEN

BACKGROUND OF THE INVENTION

1. Field of the Invention

The present invention relates to a communication system which performs non-contact proximity data transmission using near-field electromagnetic coupling effect produced between a transmission antenna and a receiving antenna disposed close to each other, and to an antenna apparatus used for such non-contact proximity data transmission. More particularly, the present invention relates to a communication system and an antenna apparatus which perform high-speed digital data transmission using near-field electromagnetic coupling effect.

2. Description of the Related Art

In recent years, in order to provide interfaces for processing a high-speed digital signal, there are standards, such as LVDS (Low Voltage Differential Signaling), XAUI (10 Giga bit Attachment Unit Interface), PCI (Peripheral Component Interconnect)-Express, etc. Some of the interfaces have a data rate of as high as over 6 Gbps. In these interface standards, a small voltage amplitude is employed in order to achieve high-speed signal transmission. However, there is a problem in that the interfaces are subject to more noise as the amplitude of voltage decreases. To overcome this problem, differential transmission is employed in place of single-ended transmission.

Among these, Low Voltage Differential Signaling (LVDS) has been developed for the purpose of reducing the number of signal lines, etc. For example, the number of signal lines necessary for transmitting a video signal having 6 bits to 10 bits for expressing individual gray scales of RGB is 20 to 40 by CMOS/TTL. Whereas by LVDS, the number can be reduced to 4 pairs (three pairs for data, and one pair for clock) to 6 pairs (five pairs for data, and one pair for clock). Main applications of LVDS include communication devices, PDPs (Plasma Display Panels), digital interfaces for liquid crystal panels, etc.

A differential transmission line controlled to have characteristic impedance of 100Ω is often used for a transmission line of a high-speed digital interface of this kind. A specific transmission line, which is employed in this case, includes a microstrip transmission line made of a dielectric substrate (printed-circuit board, etc.) having a conductor layer on a back side and a conductor pattern drawn by a line on a front side, a coaxial cable with a harness, etc. A transmitter IC (Integrated Circuit) and a receiver circuit are connected by a transmission line having a physical connection and an electrical connection as a matter of course.

As opposed to this, the present inventors think that it is possible to apply a method of high-speed digital signal transmission using a non-contact data communication technique. Non-contact communication has advantages that while data transmission is performed by radio, a transmitter and a receiver are disposed in proximity, and, thus, an intercepting device is not allowable to lie therebetween. Accordingly, secrecy may be maintained.

For example, two IC chips are mounted on one printed circuit board by flip chip attachment, and it becomes possible to perform data transmission using near-field electromagnetic coupling via transmission distances of 5.6 cm between the IC chips (for example, refer to Co-authored by Wilson J, Lei Luo, Jian Xu, Mick S., Erickson E., Hsuan-Jung Su, Chan B., How Lin, Franzon P., “AC coupled interconnect using buried bumps for laminated organic packages” (Electronic Components and Technology Conference, 2006. Proceedings. 56th, 30 May-2 Jun. 2006 Page(s):8 pp.); Co-authored by Lei Luo, John Wilson, Stephen Mick, Jian Xu, Liang Zhang, Evan Erickson, Paul Franzon, “A 36 Gb/s ACCI Multi-Channel Bus using a Fully Differential Pulse Receiver” (IEEE 2006 Custom Integrated Circuits Conference (CICC)). It is possible to achieve 2.5-Gbps data transfer by disposing an antenna electrode on the IC chip and an opposed antenna electrode on the printed circuit board, and connecting the IC chip with a transmission line on the printed circuit board using capacitive coupling between these electrodes. The sizes of antenna electrodes used here are 200 μm×200 μm for both the IC chip and the printed circuit board, and a communication distance is very short, namely 1 μm. Also, a bump is used for mounting the IC chip. That is to say, a bump formed on an IC chip is embedded on the printed circuit board, and thus both of the antenna electrodes are disposed in close proximity, which is very complicated. The IC chip is mounted by flip chip attachment, and, thus, it is difficult to detach or to replace the IC chip after the mounting.

Also, as another example of a non-contact data transmission technique, a proposal has been made of a technique of transferring data between chips produced by a laminated plurality of IC chips, which are polished as thin as tens of micrometers in consideration of SIP (System In Package) implementation (for example, refer to Japanese Unexamined Patent Application Publication No. 2005-228981; Co-authored by Miura N., Mizoguchi D., Inoue M., Sakurai T., Kuroda T., “A 195-gb/s1.2-W inductive inter-chip wireless superconnect with transmit power control scheme for 3-D-stacked system in a package” (Solid-State Circuits, IEEE Journal of Volume 41, Issue 1, January 2006 Page(s):23-34); and Co-authored by Jian Xu, John Wilson, Stephen Mick, Lei Luo, Paul Franzon, “2.8 Gb/s Inductively Coupled Interconnect for 3-D ICs” (2005 Symposium on VLSI Circuits Digest of Technical Papers)). For example, a plurality of channels including a transmission and receiving circuit, and an antenna coil are laid out on an IC chip at 50-μm intervals in proximity using a semiconductor process. When an antenna coil having a diameter of 48 μm is used, it is possible to achieve 1.0-Gbps data transfer between antennas that are 43 μm apart.

Here, non-contact data transmission techniques using near-field electromagnetic coupling can be roughly divided into techniques of using capacitive coupling between two antenna electrodes provided at a transmitter and a receiver, respectively, and techniques of using inductive coupling between two antenna coils in the same manner. Also, the above techniques can be divided into two kinds of techniques from another viewpoint. One of the techniques does not necessitate impedance matching in accordance with a length of a wire connecting a transmission and receiving circuit, and an antenna. The other techniques necessitate impedance matching.

When an antenna is disposed very near to a transmission circuit or a receiving circuit, an input/output terminal of the circuit and an input/output terminal of the antenna operate in a substantially same phase, and thus the influence of reflection can be disregarded. Accordingly, impedance matching is not always necessary. In contrast, if an antenna is disposed apart from a transmission and receiving circuit, a length of a wiring line between them (transmission line) can not be disregarded, and thus impedance matching becomes necessary between an input/output terminal of the circuit and an input/output terminal of the antenna. In particular, in the case of high-speed data transfer exceeding 1 Gbps, if there is an impedance mismatch in a system including a transmission and receiving circuit and an antenna, reflection is caused by the mismatch. Accordingly, unnecessary ringing occurs on a receive signal, which causes an increase in jitter and deteriorates an error rate. Thus, high-speed data transfer is hindered.

In the case of capacitive coupling, if an antenna electrode has a length not less than ⅛ times a signal wavelength λ (in consideration of a wavelength contraction ratio), it is necessary to consider a resonance frequency depending on the length. Also, if a parasitic inductive component (L) of a feed line is not disregarded, the parasitic inductive component and a self-capacity (C) of an antenna electrode form a series resonant circuit, and there is a self-resonant frequency $f_r$ to be determined by $1/2\pi\sqrt{LC}$. In contrast, only in the case where the antenna size is sufficiently smaller than λ/8, and the above-described parasitic inductive component can be disregarded, the circuit can be regarded to have a pure capacity. Accordingly, the coupling of the transmission and receiving antennas can be regarded as a so-called AC coupling.

On the other hand, in the case of inductive coupling, an inductive component (L) of a coil and a parasitic capacitive component (C) of a wiring line forming the coil and with respect to GND form a parallel resonant circuit, and there is also a self-resonant frequency $f_r$ to be determined by $1/2\pi\sqrt{LC}$ in this case.

In a frequency band not less than the self-resonant frequency $f_r$, the capacitive coupling antenna does not function as a capacitor, and the inductive coupling antenna does not function as an inductor. Also, resonance occurs at a signal component near $f_r$ both in the capacitive coupling antenna and in the inductive coupling antenna, and thus a frequency band that can be used for data transfer is restricted by the self-resonant frequency $f_r$.

To date, for a non-contact data transfer antenna, a so-called lumped-parameter antenna structure has often been employed. In general, a large-sized antenna tends to have a low self-resonant frequency $f_r$. Thus, in order to allow the use of a high frequency band and to increase a data transfer rate, it is necessary to set the size of the antenna small. However, in the case of non-contact communication using near-field electromagnetic coupling, a communication distance thereof becomes the same level as the antenna size. Accordingly, if a small-sized antenna is used, there is a restriction that a transfer distance also becomes short.

In this manner, in a related-art non-contact communication, there is a drawback in that the transfer distance becomes short when data is transferred at a high speed. Thus, applications of non-contact communication is limited to an ultra short distance, such as data transfer between laminated IC chips, etc. Also, if an antenna is disposed apart from a transmission/receiving circuit, and is connected to the circuit by a transmission line, a data transfer rate is limited to about ½ times an antenna band in the case of a resonant narrow-band antenna. Accordingly, there is a drawback in that it is difficult to achieve high speed.

SUMMARY OF THE INVENTION

It is desirable to provide an excellent communication system capable of performing high-speed digital data transmission using near-field electromagnetic coupling effect, and an antenna apparatus to be used for such non-contact proximity data transmission.

It is further desirable to provide an excellent communication system and an antenna apparatus which are capable of performing high-speed digital data transmission by near-field electromagnetic coupling effect using an antenna enabling use of a high-frequency band.

According to an embodiment of the present invention, there is provided a communication system including: a transmission slot antenna having a ring-shaped slot transmission line between an antenna electrode and a grounded conductor surface at a transmitter side; and a receiving slot antenna having a ring-shaped slot transmission line between an antenna electrode and a grounded conductor surface at a receiver side, wherein the transmission antenna and the receiving antenna are disposed with being opposed in proximity, and data transmission is performed using near-field electromagnetic coupling effect produced between the slot transmission lines of the transmission antenna and the receiving antenna.

However, here, a "system" means a logical set of a plurality of apparatuses (or functional modules for achieving a specific function), and is not limited to the case where individual apparatuses and functional modules are contained in a single casing.

Non-contact proximity data communication is a communication technique for performing data transmission using near-field electromagnetic coupling effect produced between a transmission antenna and a receiving antenna disposed close to each other. There are two types of techniques, capacitive coupling and inductive coupling, depending on the difference in a coupling effect to be used. Also, it is possible to classify the communication techniques depending on whether impedance matching is necessary in accordance with the length of a wiring line connecting the transmission and receiving circuit, and the antenna.

In the case of capacitive coupling, if an antenna electrode has a length not less than ⅛ times a signal wavelength λ, when a parasitic inductive component of a feed line is not disregarded, the parasitic inductive component and a self-capacity of an antenna electrode form a series resonant circuit, and there is a self-resonant frequency. On the other hand, in the case of inductive coupling, an inductive component of a coil and a parasitic capacitive component of a wiring line forming the coil and with respect to GND form a parallel resonant circuit, and there is also a self-resonant frequency. Resonance occurs near the resonance frequencies. The capacitive coupling or the inductive coupling does not operate at a frequency band of the resonance frequencies or higher, and thus there is a problem in that a frequency band that can be used for data transfer is restricted.

Also, the larger the size of an antenna becomes, the lower the self-resonant frequency tends to be. Thus, in order to allow the use of a high frequency band and to increase a data transfer rate, it is necessary to set the size of the antenna small. However, in the case of non-contact communication using near-field electromagnetic coupling, a communication distance thereof becomes the same level as the antenna size. Accordingly, if a small-sized antenna is used, the transfer distance also becomes short. That is to say, the transfer distance becomes short when data is transferred at a high speed. Also, if an antenna is disposed apart from a transmission and receiving circuit, and is connected to the circuit by a transmission line, a data transfer rate is limited to about ½ times an antenna band in the case of a resonant narrow-band antenna. Accordingly, it is difficult to achieve high speed.

In contrast, in a communication system according to the present invention, non-contact data communication is performed between a transmitter and a receiver whose antennas are disposed close to each other. As a data transfer principle, the communication system uses coupling of transmission lines originally having a small frequency variance, and employs non-resonant configuration. Specifically, two slot antennas are disposed being opposed in proximity, and coupling is directly performed between a near-field electric field component or a near-field magnetic field component of a $TE_{10}$ wave traveling along the slot transmission line of the transmission antenna. This is different from a resonant antenna.

The slot antenna has a ring-shaped slot transmission line between the antenna electrode and grounded conductor surface. Here, regarding the shape of the slot antenna having a ring-shaped slot, a shape of the electrode surrounded with the grounded conductor surface is preferably a regular polygon, such as a regular octagon, a regular hexagon, etc. In such a case, the ring-shaped slot between the antenna electrode and a grounded conductor surface is suitably considered to be a slot transmission line. Also, two feed points are disposed sandwiching the center of the ring-shaped slot. A length of the slot line between the two feed points is substantially equal in the clockwise direction and in the counterclockwise direction, and thus the slot line plays an equal role for signal transmission between the transmission antenna and the receiving antenna.

The slot transmission line goes to the other of the surfaces of the substrate through a through hole at each of the feed points, and is connected to a microstrip transmission line connected to a transmission IC or a receiving IC. It becomes possible to reduce an amount of reflection and to prevent the occurrence of a stationary wave by reducing an impedance mismatch at connection time between the slot transmission line and the microstrip transmission line through the through hole. Thus, it is possible to have a broadband characteristic. It is possible to obtain impedance matching by setting a ratio between a characteristic impedance of two slot transmission lines connected in parallel between the two feed points and a characteristic impedance of a microstrip transmission line is set to about 2:1.

Also, the slot transmission line has a large frequency variance of the characteristic impedance compared with the microstrip transmission line. However, it is possible to obtain good transmission characteristic having little reflection in a broad frequency band by designing to match the characteristic impedance individually in the vicinity of center frequencies of the frequency band necessary for digital baseband signal transmission.

When a transmission antenna and a receiving antenna are disposed close to each other, and a high-speed digital baseband signal is directly supplied to the transmission antenna as a transmission signal, an electromotive force occurs between the transmission antenna and the receiving antenna by near-field electromagnetic coupling effect. Thus, it is possible to perform non-contact data transfer using this effect. As described above, a transmission line having a broadband characteristic itself is used as an antenna, it is possible to directly transmit a broadband AC component included in a digital baseband as a pulse signal from the transmission antenna to the receiving antenna. Accordingly, the communication system is suitable for increasing speed of the system and reducing power consumption without necessitating complicated modulation and demodulation circuits by directly transmitting the digital baseband signal. Thus, it is possible to easily achieve a communication system having a transmission rate exceeding Gbps.

If a length of slot transmission line is less than a wavelength of a progressive wave, compared with the amplitude of the progressive wave traveling in a forward direction, the amplitude of a progressive wave (so-called return current) traveling in a backward direction becomes large and dominant. Thus, if an antenna is manufactured to have a small size, etc., the receiving circuit ought to obtain, on the slot transmission line of the receiving antenna, a receive signal flowing in the opposite direction to the direction of the progressive wave input into the slot transmission line of the transmission antenna.

Also, an antenna used in a communication system according to the present invention is a non-resonant antenna. Thus, the antenna is not restricted by the self-resonant frequency $f_r$. Accordingly, a broad band can be kept even if the size of the antenna is increased, and thus a communication distance in the non-contact communication system can be extended.

Here, it is possible to configure a transmission antenna and a receiving antenna not by a double-sided substrate, but by a three-layer or a four-layer (that is to say, not less than two-layer) substrate individually. However, in this case, it is necessary not to dispose an inner pattern on a portion overlapping the antenna structure so that the inner pattern does not electrically influence on the antenna electrode and the slot transmission line. For example, an inner pattern ought to be used for a grounded conductor surface, a portion overlapping the antenna electrode and the microstrip transmission line ought to be largely cut away, or an opening which is slightly larger than the antenna electrode ought to be formed on a portion overlapping the antenna electrode.

Also, the concept of the present invention, in which a transmission line having a substantially broadband characteristic itself is used as a non-contact data transfer antenna, and a digital baseband signal is directly transmitted, can be applied not only to single-ended transmission, but also to differential signal transmission. When a small amplitude voltage is used in order to achieve high-speed signal transmission, it is advantageously possible to restrain influence of noise by differential signal transmission.

When differential signal transmission is performed, the antenna electrode of the slot antenna at the transmitter side is divided into two substantially along a line perpendicular to a line connecting the two feed points, and a differential signal, such as LVDS or CML, etc., is supplied to the individual two feed points. Also, each antenna electrode is properly terminated at two points of both end parts of a divided gap, and thus it is possible to obtain good transmission characteristic with little reflection. Then, a differential signal can be obtained from the two feed points disposed at the antenna electrode at the receiver side.

In general, good impedance matching is not necessarily obtained at an output stage of a digital signal with a transmission line. For example, in the case of an open drain configuration, such as CML (Common Mode Logic), etc., the output impedance changes between a low impedance (a few Ω) to a high impedance (hundreds of Ω) in accordance with output data (0, 1). In such a case, a reflective wave occurred by an impedance mismatch at a transmission antenna returns to a transmission IC, and is reflected by the output stage thereof, and then enters into the transmission antenna again. Then, a large intersymbol interference occurs, and undesirable adverse effects, such as an increase in jitter and a deterioration of bit error rate (BER) might be caused at a receiving IC side.

In contrast, an antenna apparatus according to present invention has a characteristic having little reflection in a wide frequency range. Accordingly, the antenna apparatus does not necessarily require good impedance matching at an output stage with a transmission line, and has advantages in that cost and consumption power can be reduced. In particular, the antenna apparatus has an affinity to a differential digital signal, and thus has an advantage in that a high-speed serial transfer technique, which is currently widespread, can be applied.

Also, an antenna apparatus according to present invention has a configuration in which an antenna electrode to which a digital signal is supplied and the surrounding grounded conductor surface are separated by a ring-shaped slot, and thus electromagnetic field distribution is limited to a local range. Accordingly, it is possible to ensure isolation even if a plurality of antennas are disposed on a same substrate. Thus, it is possible to increase the number of channels, and to expand a data transfer band of the system. Further, it is possible to fabricate an antenna and an IC on a same multi-layer printed circuit board. Thereby, it is possible to miniaturize the system and to reduce cost.

Of course, in a communication system according to the present invention, a transmitter and a receiver are disposed in proximity, and thus an illegal device for interception of communications between the two is not allowed to lie therebetween. Accordingly, it is not necessary to prevent hacking of data communications on the transmission line, and to consider how to maintain secrecy between the transmitter and receiver.

By the present invention, it is possible to provide an excellent communication system and antenna apparatus which are capable of performing high-speed digital data transmission by near-field electromagnetic coupling effect using an antenna enabling use of a high-frequency band.

Also, by the present invention, it is possible to provide an excellent communication system and antenna apparatus which are capable of directly transferring a digital baseband signal without contact using a pulse signal including broadband frequency components.

By the present invention, it is possible to ensure impedance matching over a very broad band, and to employ a communication system having a good transmission characteristic by employing a transmission line having a substantially broadband characteristic itself as a non-contact data transfer antenna, and, in particular, using a slot antenna having a ring-shaped slot. For example, it becomes possible to easily achieve a non-contact transfer distance of about 5 mm at a transfer rate of 5 Gbps or more. Also, it is possible to directly transmit a broadband AC components included in a digital baseband as a pulse signal. Accordingly, the communication system is suitable for a high speed and for reduction of power consumption without necessitating complicated modulation and demodulation circuits.

Other and further objects, features and advantages of the present invention will become apparent by the detailed description based on the following embodiments of the present invention and the accompanying drawings.

DESCRIPTION OF THE PREFERRED EMBODIMENTS

In the following, detailed descriptions will be given of embodiments of the present invention with reference to the drawings.

In a communication system according to the present invention, non-contact data transmission is performed using a near electromagnetic field. The communication system directly transmits a broadband AC component included in a digital baseband as a pulse signal from a transmission antenna to a receiving antenna using a transmission line having a substantially broadband characteristic itself as a non-contact data transfer antenna. The communication system directly transmits a digital baseband signal, and thus is suitable for increasing speed of the system and reducing power consumption without necessitating complicated modulation and demodulation circuits.

Figure 1:
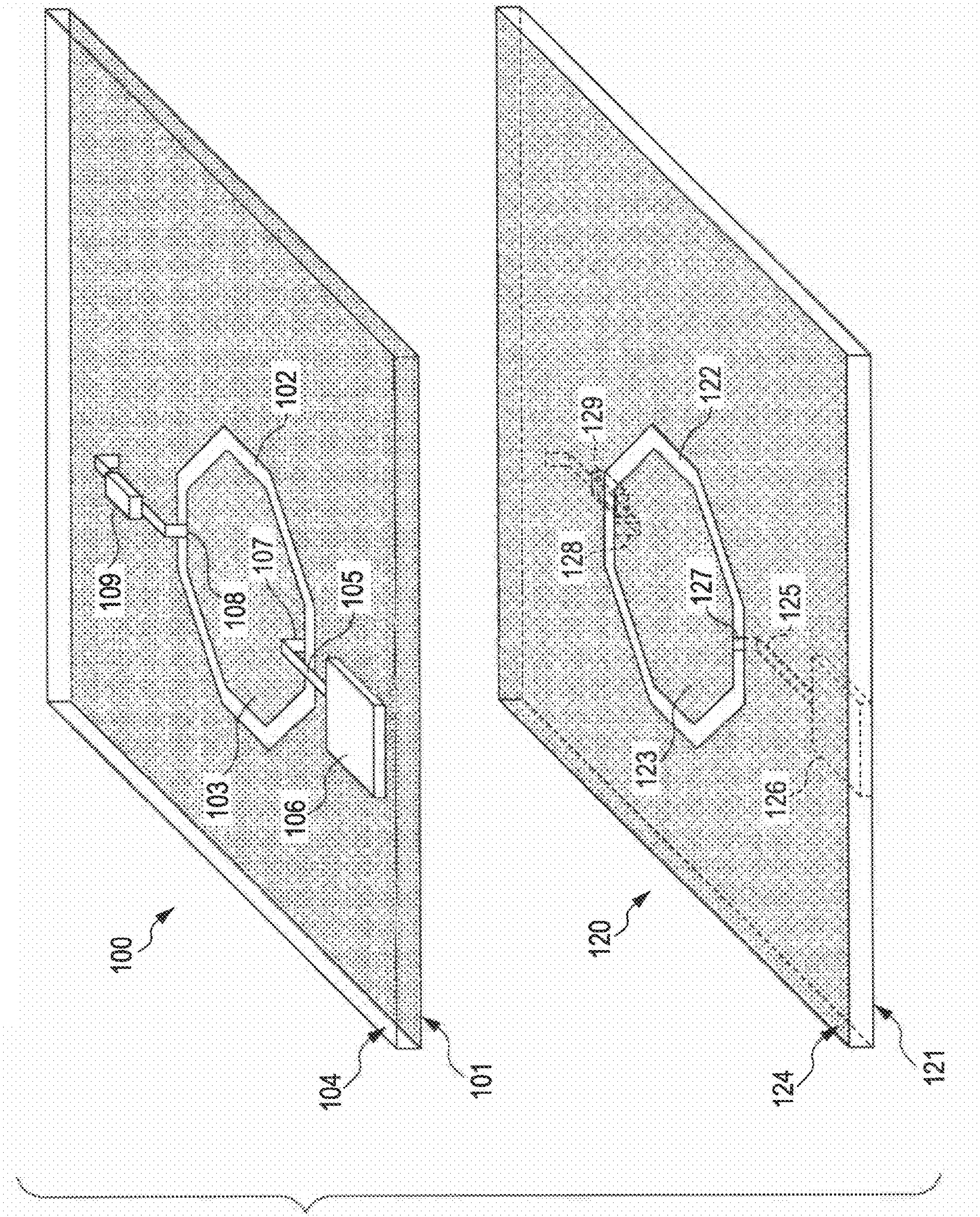
FIG. 1 is a diagram illustrating an example of a configuration of a communication system according to an embodiment of the present invention.

FIG. 1 illustrates an example of a configuration of a communication system according to an embodiment of the present invention. In the communication system shown in the figure, a transmission substrate 100 and a receiving substrate 120 are disposed with being opposed in proximity, and single-ended digital data transfer is performed.

Both the transmission substrate 100 and the receiving substrate 120 include a dielectric substrate having one of surfaces on which a conductor layer is formed, and the other of the surfaces on which a circuit component is mounted.

Surface 101 of the transmission substrate 100, which faces the receiving substrate 120, is made of a conductor layer, and has a slot antenna 103 having a ring-shaped slot transmission line, namely, a ring-shaped slot 102 formed between a central antenna electrode on the surface 101 and the surrounding grounded conductor. Regarding the shape of the slot antenna 103, the shape of the Electrode surrounded with the grounded conductor is preferably a regular polygon, such as a regular octagon, a regular hexagon, etc., in addition to a circle as shown in the figure (described later).

On the slot antenna 103 including the ring-shaped slot 102, two feed points 107 and 108 are disposed sandwiching the center of the ring-shaped slot 102.

Feed point 107 is connected to a feed line 105 comes out from a transmission IC 106 on the other surface 104 of the transmission substrate 100 through a through hole. The feed line 105 is configured as a microstrip transmission line made of a linear conductor pattern formed on the other surface 104 of the transmission substrate 100. The characteristic impedance of the microstrip transmission line can be adjusted by a line width thereof and a thickness of the transmission substrate 100 (for example, refer to Written by Arai Hiroyuki, "New Antenna Engineering—Antenna Technology for Mobile Communication Era—" Sogo Denshi Shuppan Sha, Sep. 10 2001, Third Edition, Pages: 30-31). Here, it is possible to reduce an amount of reflection and to prevent the occurrence of a stationary wave by reducing a connection impedance mismatch between the slot transmission line and the microstrip transmission line through the through hole. Thus, it is possible to have a broadband characteristic.

Also, the other feed point 108 is disposed at a position substantially opposite to the feed point 107 sandwiching the center of the slot antenna 103, and is connected to a terminating resistor 109 on the other surface 104 of the transmission substrate 100 through a through hole. As shown in the figure, a length of the slot line between the feed points 107 and 108 is substantially equal in the clockwise direction and in the counterclockwise direction, and thus the slot line plays an equal role for signal transmission between the transmission antenna and the receiving antenna.

In the same manner, surface 124 of the receiving substrate 120, which faces the transmission substrate 100, is made of a conductor layer, and has a slot antenna 123 having a ring-shaped slot 122 formed between an antenna electrode and grounded conductor. Two feed points 127 and 128 are disposed about the center of the ring-shaped slot 122.

Feed point 127 is connected to a feed line 125 including a microstrip transmission line connected to a receiving IC 126 on the surface 121 of the receiving substrate 120 through a through hole. Note that an impedance mismatch between the slot transmission line and the microstrip transmission line through the through hole at connection time is kept small (the same as above).

Also, the feed point 128 is disposed at a position substantially opposite to the feed point 127 about the center of the slot antenna 123, and is connected to a terminating resistor 129 on the other surface 121 of the receiving substrate 120 through a through hole. As shown in the figure, a length of the slot line between the feed points 127 and 128 is substantially equal in the clockwise direction and in the counterclockwise direction, and thus the slot line plays an equal role for signal transmission between the transmission antenna and the receiving antenna (the same as above).

Figure 2:
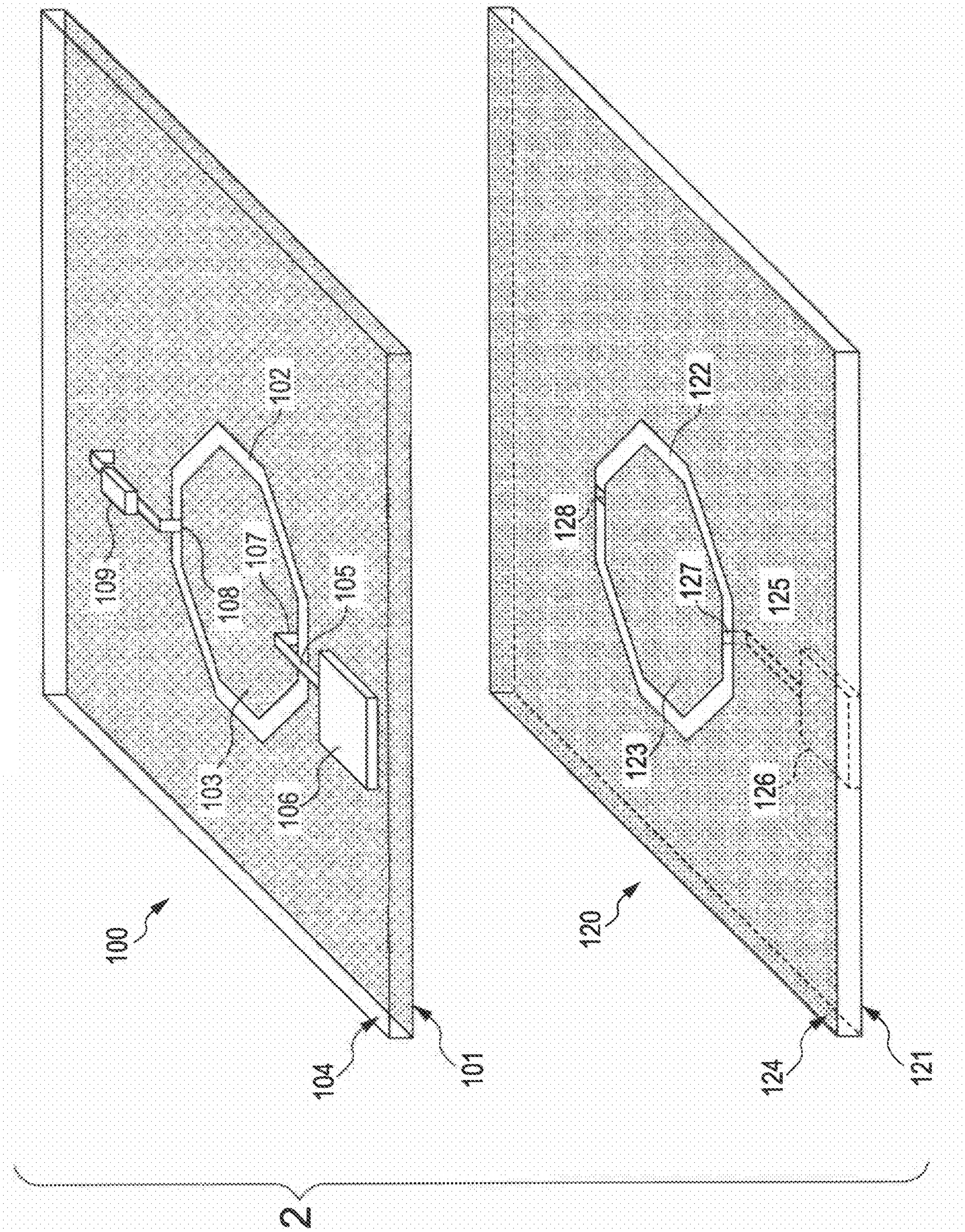
FIG. 2 is a diagram for explaining a variation of a receiving substrate.

In this regard, at the receiving antenna side, the terminating resistor 129 can be set to 0Ω. In this case, as shown in FIG. 2, the antenna electrode may directly short with the grounded conductor at the feed point 128 without passing through the through hole. Otherwise the reference numbers describe the same features as in FIG. 1.

A description will be given of an operation principle of the antenna shown in FIG. 1 with reference to FIGS. 3A, 3B, 3C, and 4.

Regarding the shape of the slot antenna having a ring-shaped slot, the shape of the electrode surrounded with the grounded conductor is preferably a regular polygon, such as a regular octagon, a regular hexagon, etc. In such a case, the ring-shaped slot between the antenna electrode and a grounded conductor surface is suitably considered to be a slot transmission line. On the other hand, if an antenna electrode is rectangular-shaped, and the direction connecting two feed points (a height of the rectangle) is sufficiently large with respect to the perpendicular direction (a width of the rectangle) thereof, the antenna electrode is suitably considered to be a coplanar transmission line. In the following, a description will be limitedly given of the case where the ring-shaped slot is considered to be the former slot transmission line.

Figure 3A:
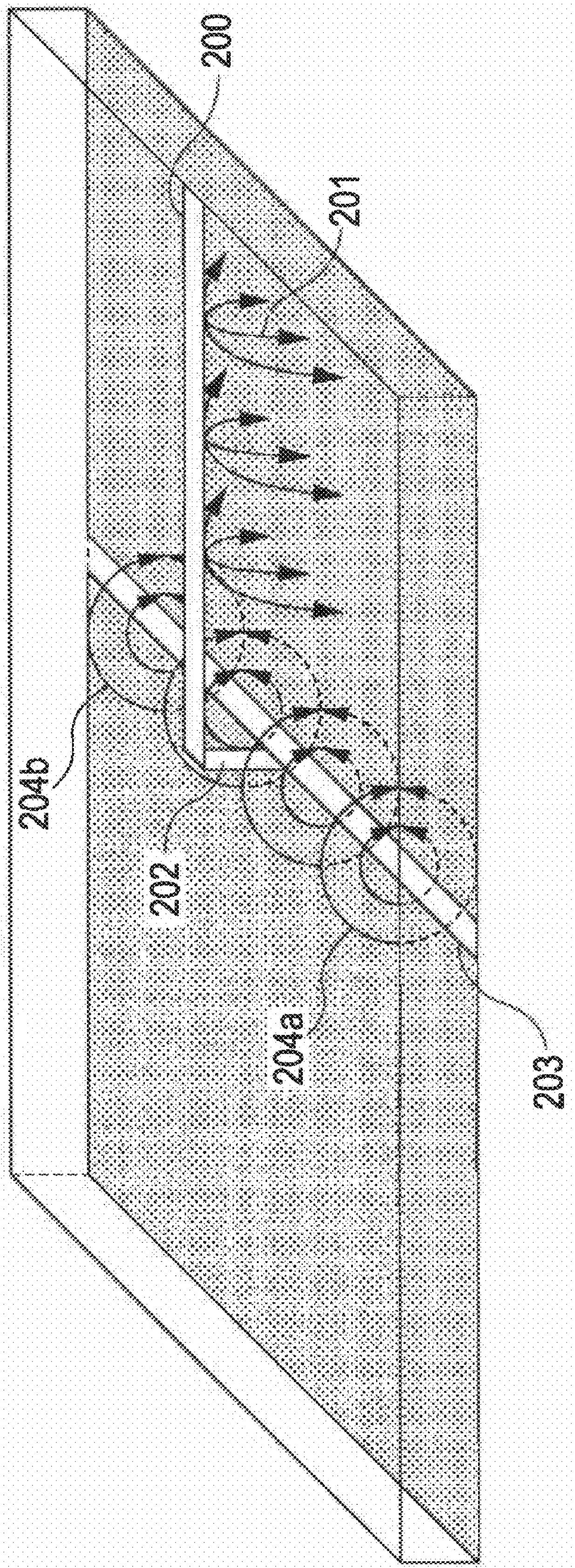
FIG. 3A is a diagram for explaining an operation principle of an antenna to be used in the communication system shown in FIG. 1.
Figure 3B:
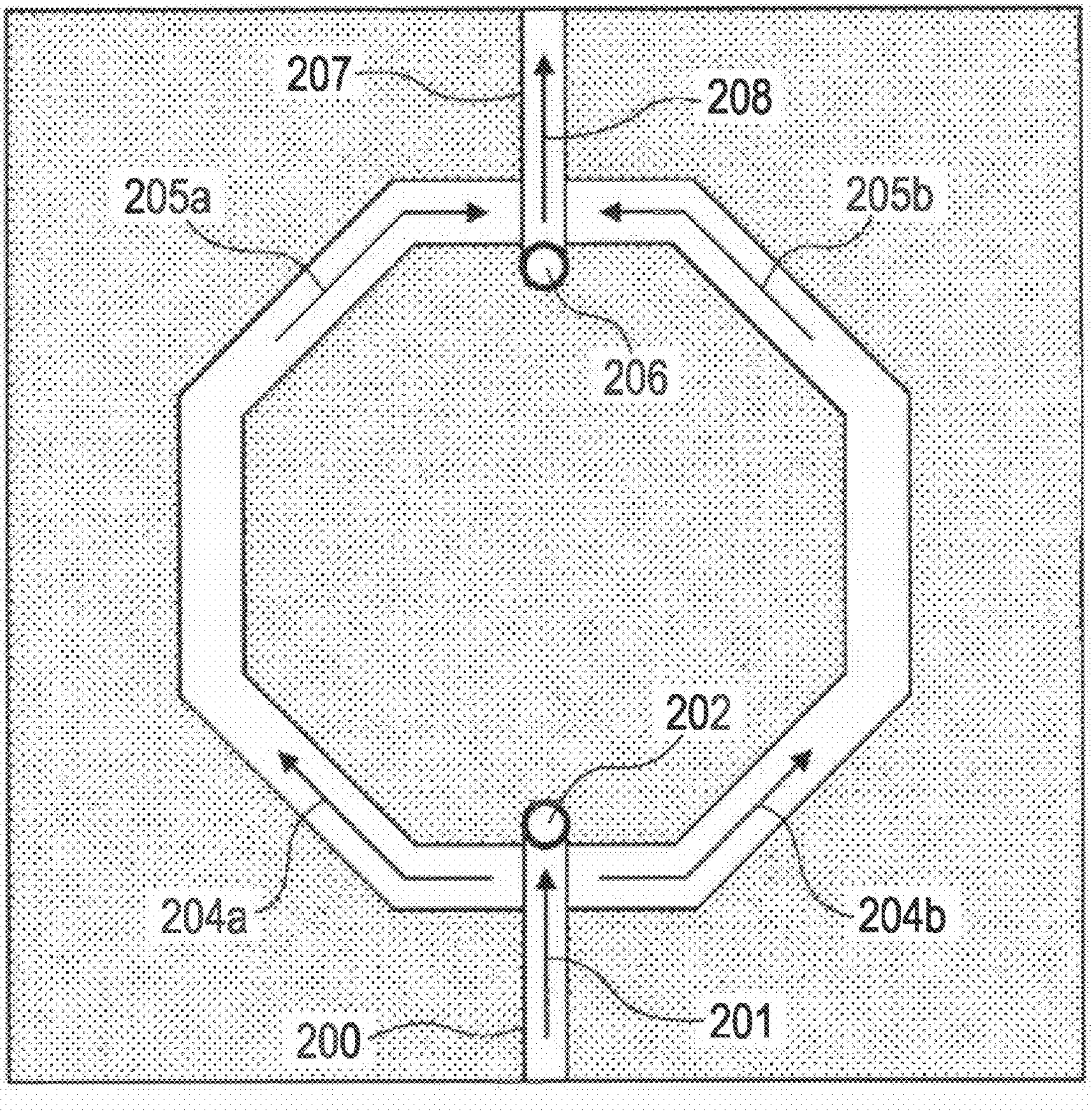
FIG. 3B is a diagram for explaining an operation principle of an antenna to be used in the communication system shown in FIG. 1.
Figure 3C:
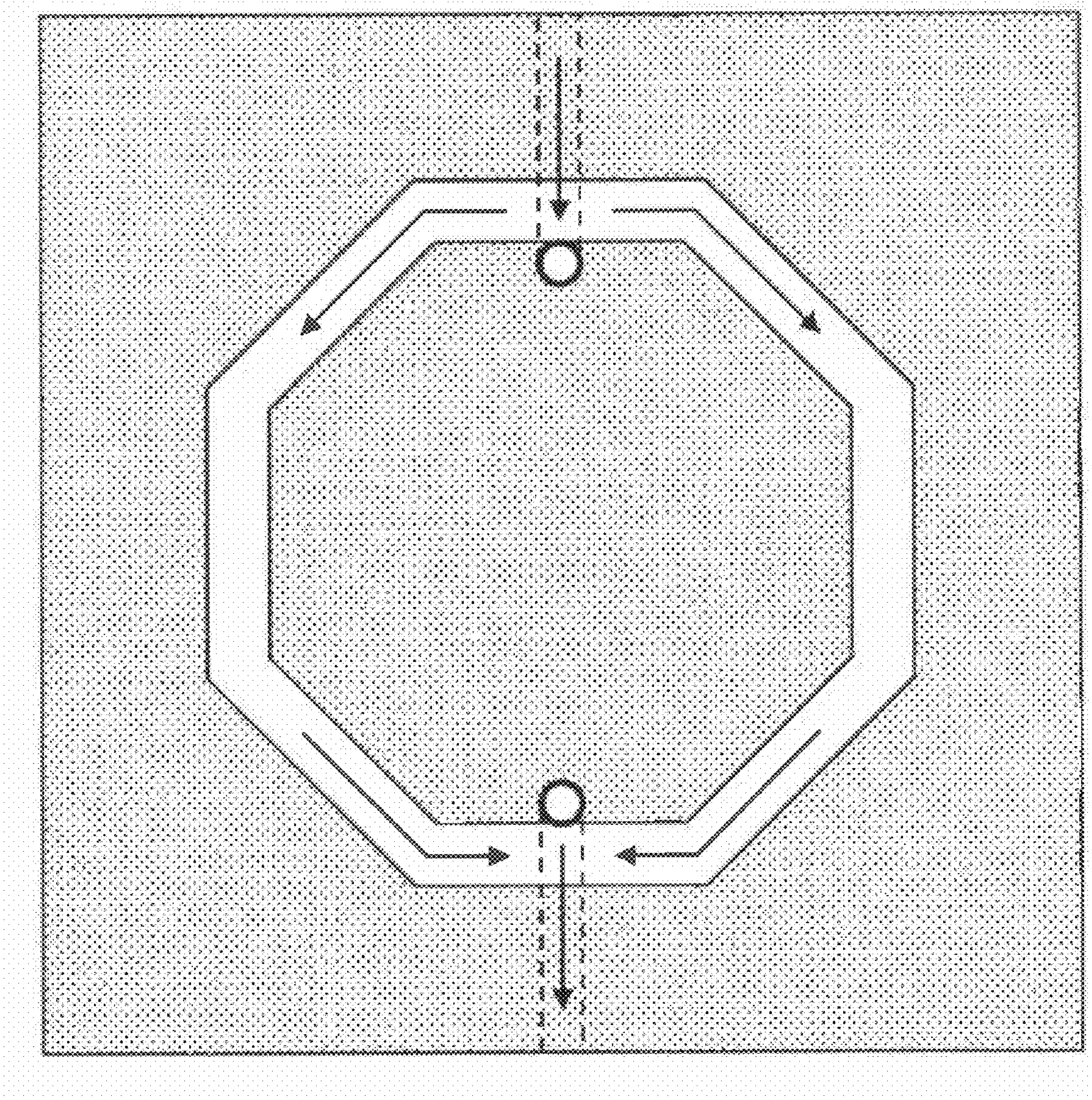
FIG. 3C is a diagram for explaining an operation principle of an antenna to be used in the communication system shown in FIG. 1.

FIGS. 3A, 3B, and 3C illustrate states of a progressive wave traveling the transmission antenna and the receiving antenna in the communication system shown in FIG. 1.

In the structure of the transmission antenna shown in FIG. 3A, the feed line made of a microstrip transmission line 200 is connected substantially perpendicular to the slot transmission line 203 at feed point 202 on the ring-shaped slot through a through hole. In this regard, a method of converting a microstrip transmission line into a coplanar transmission line through a through hole, and a method of converting a coplanar transmission line into a slot transmission line are described in Written by Aikawa Masayoshi, et al., "Monolithic Microwave Integrated Circuit (MMIC)" (The Institute of Electronics, Information and Communication Engineers, Jan. 25, Heisei 9 First Edition, Pages 50-51). For example, it is possible to convert a microstrip transmission line into a strip transmission line through a coplanar transmission line.

A quasi-TEM (Transverse Electric Magnetic) wave 201 flowing in from the microstrip transmission line 200 is subjected to line transition as described above, and then as shown in FIG. 3B, is converted into two progressive waves of $TE_{10}$-mode (there is an electric-field component only in cross section), which are traveling in the opposite directions with each other at the feed point 202. In FIG. 3B, a progressive wave traveling clockwise along the ring-shaped slot is denoted by reference numeral 204*a*, and a progressive wave traveling counterclockwise along the ring-shape slot is denoted by reference numeral 204*b*.

The two progressive waves 204*a* and 204*b* traveling on the slot transmission line 203 in the opposite directions with each other are synthesized at the feed point 206 of the ring-shaped slot as two progressive waves 205a and 205b, individually, and are connected to a microstrip transmission line 207 through a through hole to be converted into a quasi-TEM wave 208 again.

As described later, when near electric field and near magnetic field leaked out from individual progressive waves, which branch into two directions and travel on the slot transmission line at a transmission antenna side, reach the slot transmission line of the receiving antenna, progressive waves traveling in a forward direction and in the opposite direction are induced by electromagnetic coupling effect. FIG. 3C illustrates a state of the progressive waves induced, at the receiving antenna side, in the opposite direction of the progressive wave traveling on the slot transmission line of the transmission antenna side. The operations of line transition from the microstrip transmission line to the slot transmission line and from the slot transmission line to the microstrip transmission line are the same for the receiving antenna as described above.

As described above, a length of the slot line between the two feed points is substantially equal in the clockwise direction and in the counterclockwise direction, and thus the slot line plays an equal role for signal transmission between the transmission antenna and the receiving antenna. Here, if the slot transmission line 203, to which the microstrip transmission lines 200 and 207 are connected at the individual feed points 202 and 206, is interpreted from circuitry view, the circuit has a configuration in which two slot transmission lines on which the two progressive waves 204a (205a) and 204b (205b) of $TE_{10}$-mode are traveling in the opposite directions with each other, are connected in parallel with one microstrip transmission line. Accordingly, it is possible to obtain impedance matching by setting a ratio between a characteristic impedance of the two slot transmission lines connected in parallel and a characteristic impedance of the microstrip transmission line is set to about 2:1.

The slot transmission line has a large frequency variance of the characteristic impedance compared with a transmission line of the microstrip. However, it is possible to obtain good transmission characteristic having little reflection in a broad frequency band by designing to match characteristic impedance individually in the vicinity of center frequencies of the frequency band necessary for digital baseband signal transmission.

Figure 4:
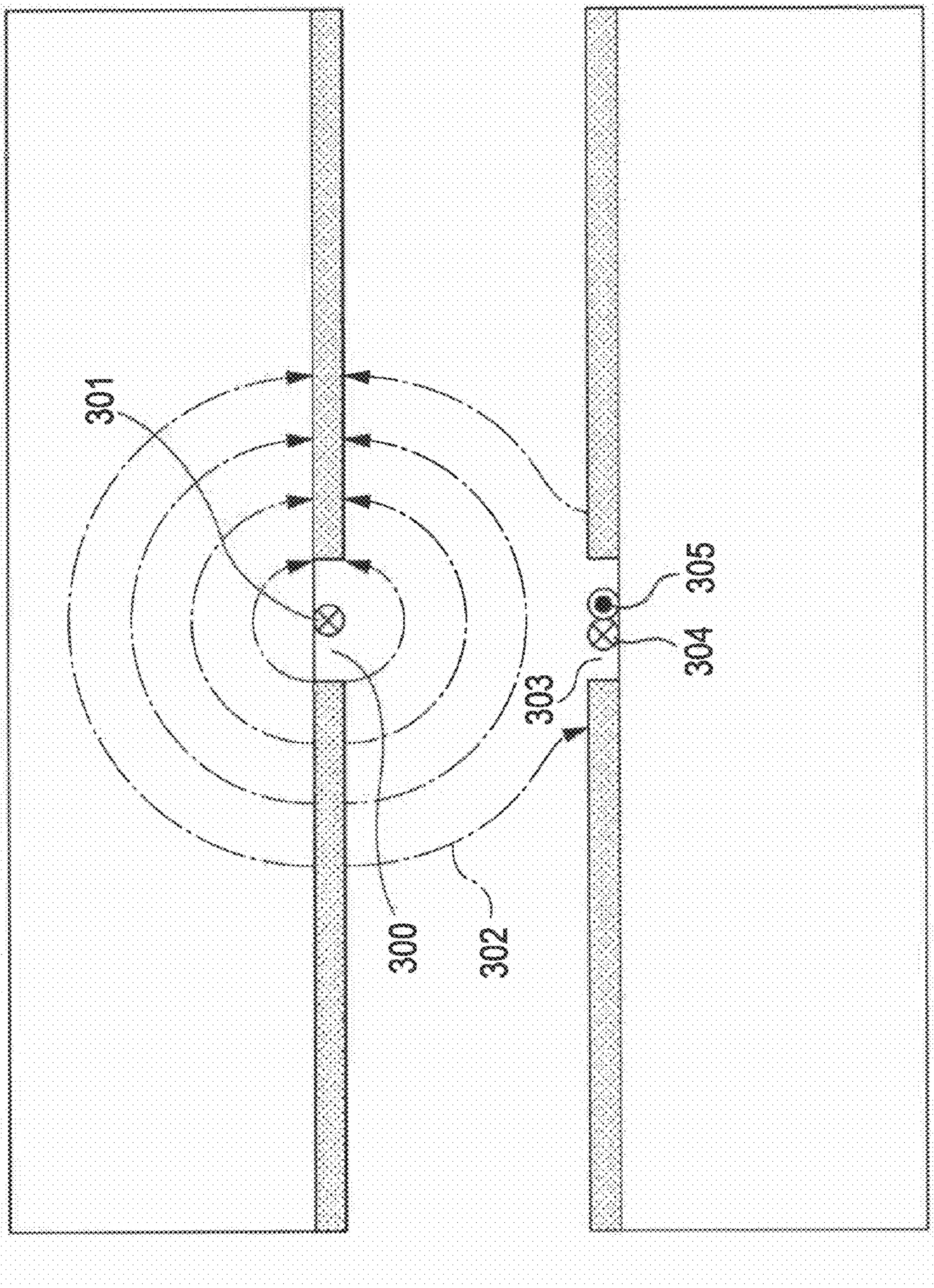
FIG. 4 is a diagram for explaining an operation principle of an antenna to be used in the communication system shown in FIG. 1.

FIG. 4 illustrates a state of a near electric field produced between a transmission antenna and a receiving antenna disposed with being opposed in proximity. Note that an arrow dash-single-dot line in the figure schematically represents a line of electric force. As shown in the figure, when a progressive wave 301 travels along a slot transmission line 300 of a transmission antenna, an electric field 302 substantially concentrically surrounding the slot transmission line 300 occurs. When the near electric field and the near magnetic field (not shown in the figure) leaked out from the progressive wave 301 traveling along the slot transmission line 300 of the transmission antenna reaches the slot transmission line 303 of the receiving antenna, a progressive wave 304 traveling on the slot transmission line 303 in a forward direction with respect to the progressive wave 301 and a progressive wave 305 traveling on the slot transmission line 303 in the opposite direction to the progressive wave 301 are induced by electromagnetic coupling effect.

In particular, an electric-field analysis made by the present inventors shows that if a length of slot transmission line is less than a wavelength of a progressive wave, compared with the amplitude of the progressive wave traveling in the forward direction, the amplitude of a progressive wave (a so-called return current) traveling in a backward direction becomes large and dominant. Accordingly, in a small-sized system, if an antenna area is desired to be reduced, it is advantageous to have a configuration in which a receiver obtains a receive signal in the opposite direction to a traveling direction of the progressive wave input into the transmission antenna. Measurement results shown in FIGS. 6 to 8 reveal this, and a detailed description will be given later on this point.

As described with reference to FIGS. 3A to 3C, in the transmission antenna and the receiving antenna used in a communication system according to the present embodiment, a transmission line itself is used as an antenna, it is possible to directly transmit broadband AC components included in a digital baseband as a pulse signal from the transmission antenna to the receiving antenna. That is to say, in a state of disposing a transmission and a receiving antennas close to each other, if an transmission IC directly supplies a high-speed baseband signal to the transmission antenna, an electromotive force arises between the transmission antenna and the receiving antenna by near-field electromagnetic coupling effect, and thus it is possible to perform non-contact data transfer using this. The communication system directly transmits the digital baseband signal, and thus is suitable for increasing speed of the system and reducing power consumption without necessitating complicated modulation and demodulation circuits.

A description will be given of a principle of non-contact digital data transfer in the communication system shown in FIG. 1 with reference to FIGS. 5A and 5B.

In a transmission antenna and a receiving antenna according to the present embodiment, it is possible to restrain a return loss at very low over a frequency of 10 GHz or more from a direct current (DC) component, and thus to directly input a digital baseband signal without performing modulation (as already described, it is possible to reduce an amount of reflection and to prevent the occurrence of a stationary wave by reducing impedance mismatch at connection time between the slot transmission line and the microstrip transmission line through a through hole).

Figure 5A:
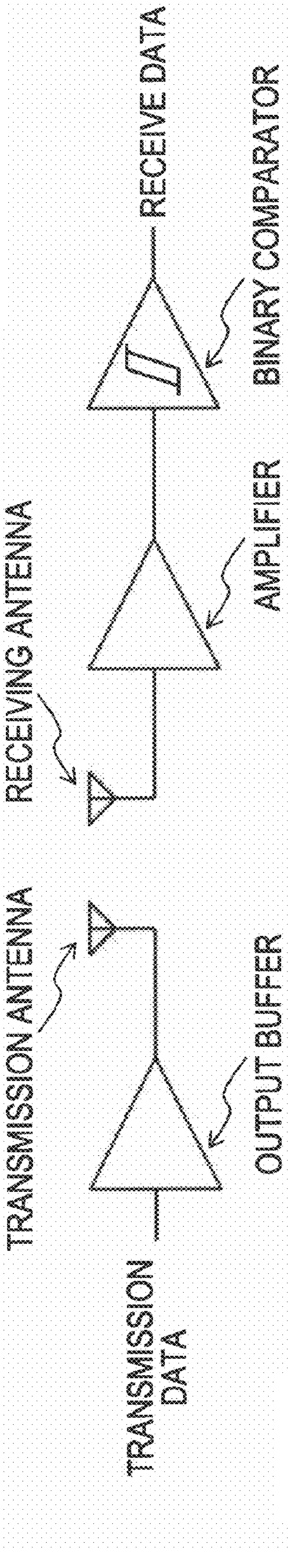
FIG. 5A is a diagram for explaining a principle of non-contact digital data transfer in the communication system shown in FIG. 1.

FIG. 5A schematically illustrates configurations of a transmitter and a receiver. At the transmitter side, transmission data including a digital baseband signal is directly supplied to the transmission antenna through a output buffer. At the receiver side, when a transmitted signal is received by the receiving antenna in accordance with the operation principle described with reference to FIGS. 3 to 4, this signal is power-amplified by an amplifier, is subjected to binarization processing by a binary comparator to be reproduced as original digital baseband signal. This signal is output as the receive data.

Figure 5B:
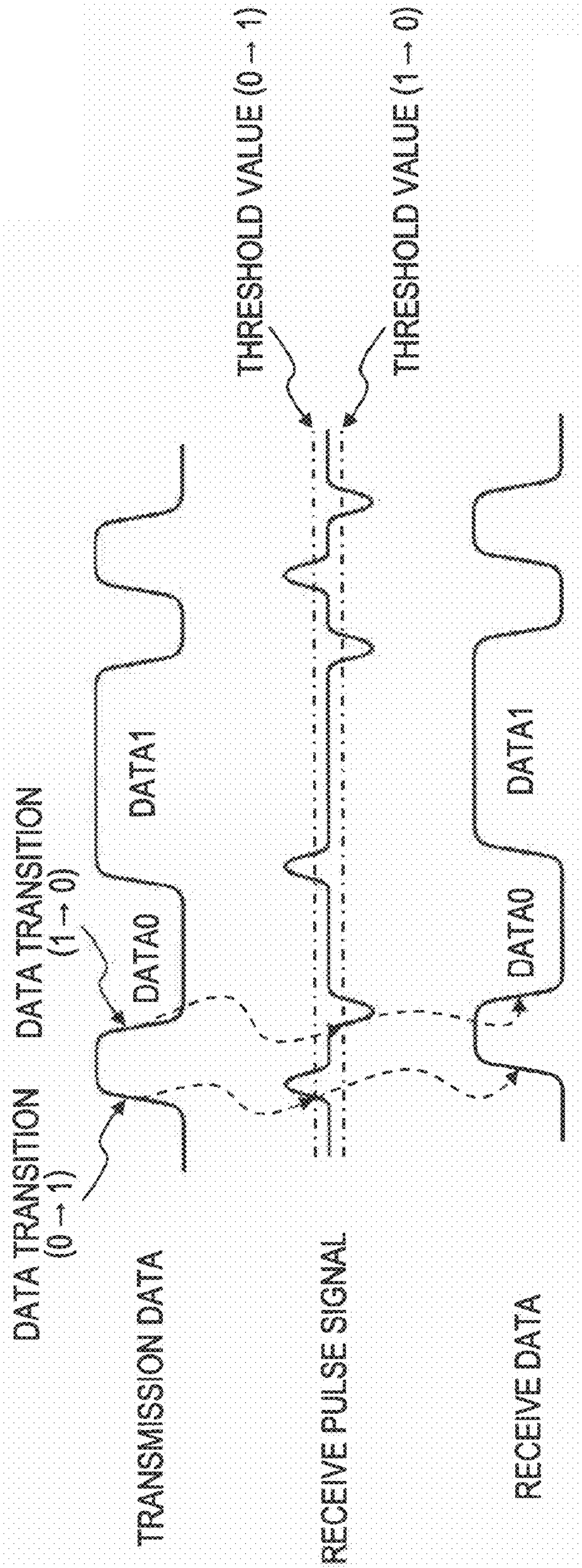
FIG. 5B is a diagram for explaining a principle of non-contact digital data transfer in the communication system shown in FIG. 1.

FIG. 5B illustrates an example of transmission data represented by a digital baseband signal and receive data (Data 0 and Data 1) obtained from a receive pulse signal. As shown in upper part in FIG. 5B, the transmission digital baseband signal includes an AC component accompanied by binary data transition from 0 to 1 and from 1 to 0.

As described with reference to FIG. 4, near electromagnetic field produced by a transmission antenna is transmitted to a receiving antenna by electromagnetic coupling effect. As shown in the middle part of FIG. 5B, an AC component accompanied by the data transition of the transmission digital baseband signal is received by the receiving antenna as a pulse signal in accordance with a polarity of the transition. A dashed line in FIG. 5B corresponds to a determination threshold value of the binary comparator, and determines data transition of 0 to 1 and 1 to 0. That is to say, as shown in the lower part of FIG. 5B, it is possible to reproduce digital data from the polarity of the received pulse signal. It should be understood that the digital baseband signal can be directly transmitted.

The present inventors test-manufactured a slot antenna having a ring-shaped slot transmission line between an antenna electrode and a grounded conductor. A description will be given of that result with reference to FIGS. 6A, 6B, 7A, 7B, 8A, 8B and 8C.

In FIGS. 1 and 2, antenna structures of a double-sided substrate (two layers of conductor surfaces) are assumed. However, it is possible to create a substrate of two layers or more, such as three layers, four layers, etc. Note that if an antenna substrate is constructed by four layers, it is necessary not to dispose inner layer patterns of a second layer and a third layer on a portion overlapping the antenna structure in order not to give electrical influence on the antenna electrode and the slot transmission line.

Figure 7A:
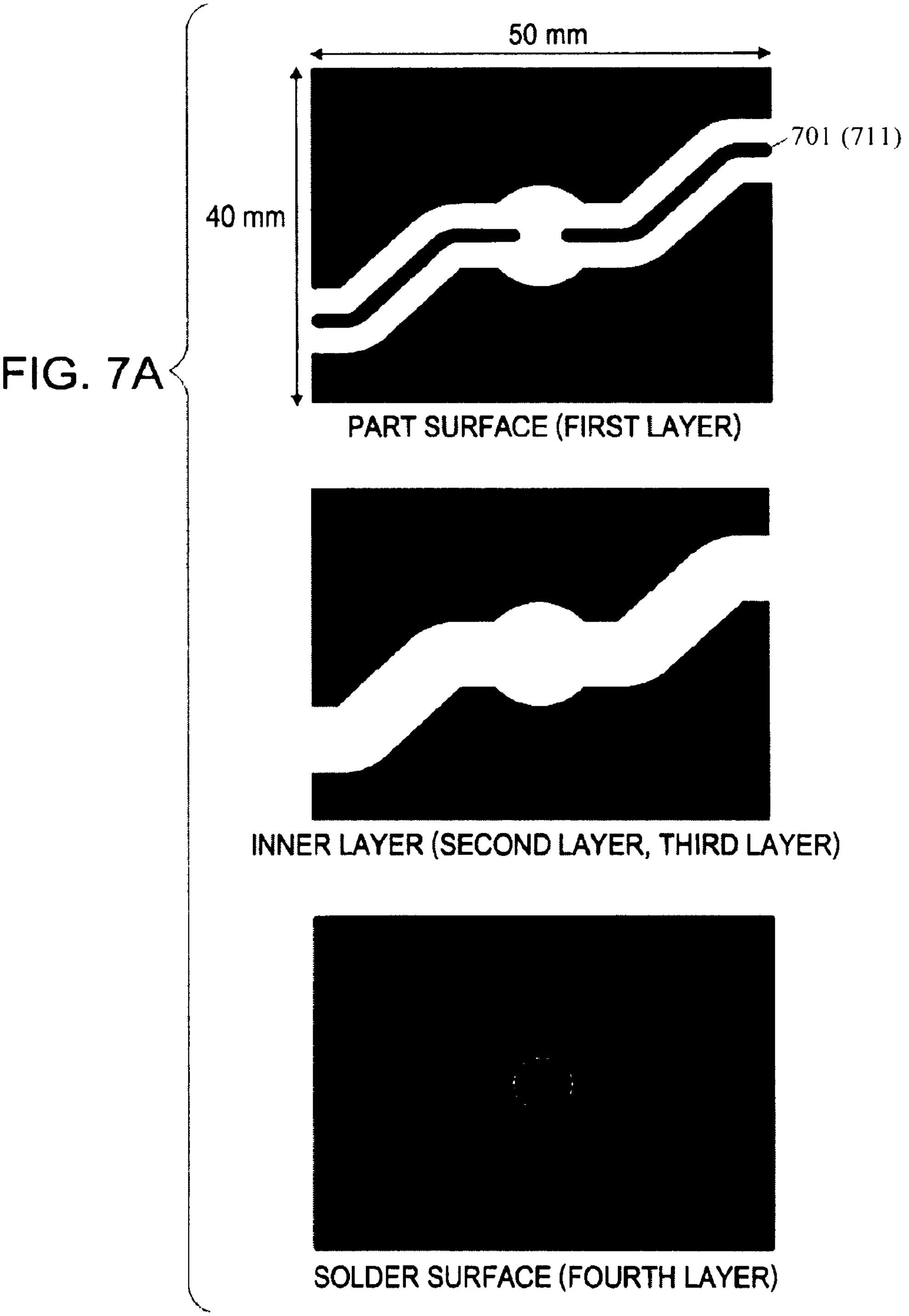
FIG. 7A is a diagram illustrating an operating result of a slot antenna having a ring-shaped slot transmission line between an antenna electrode and a grounded conductor.
Figure 8A:
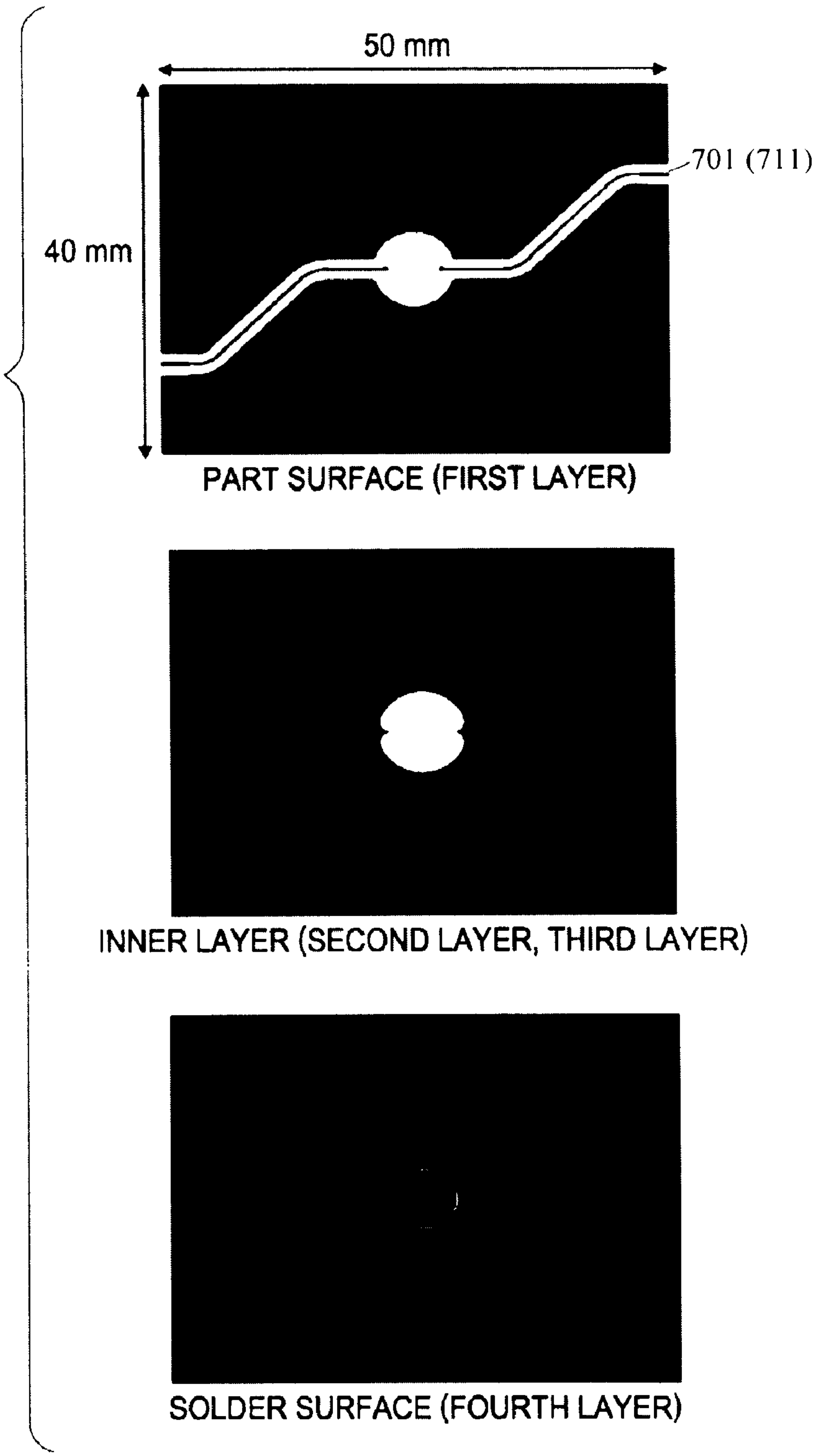
FIG. 8A is a diagram illustrating an operating result of a slot antenna having a ring-shaped slot transmission line between an antenna electrode and a grounded conductor.

FIGS. 7A and 8A illustrate examples of structures of antenna substrates which were test-manufactured using a four-layer FR4 substrate with dimension of 50 mm by 40 mm and having a thickness of 0.8 mm (not shown herein), respectively. In both of the substrates, a microstrip transmission line is disposed on a first-layer part surface, and an antenna electrode is disposed on a fourth-layer solder side. In a prototype shown in FIG. 7A, inner-layer patterns of a second layer and a third layer are used as grounded conductor surfaces, and a part overlapping the antenna electrode and the microstrip transmission line are largely cut away to have a same layer structure as a double-sided substrate. Also, in a prototype shown in FIG. 8A, inner-layer patterns of a second-layer and a third-layer are used for grounded conductor surfaces, and a part overlapping the antenna electrode is provided with a slightly larger opening than the antenna electrode.

Figure 6A:
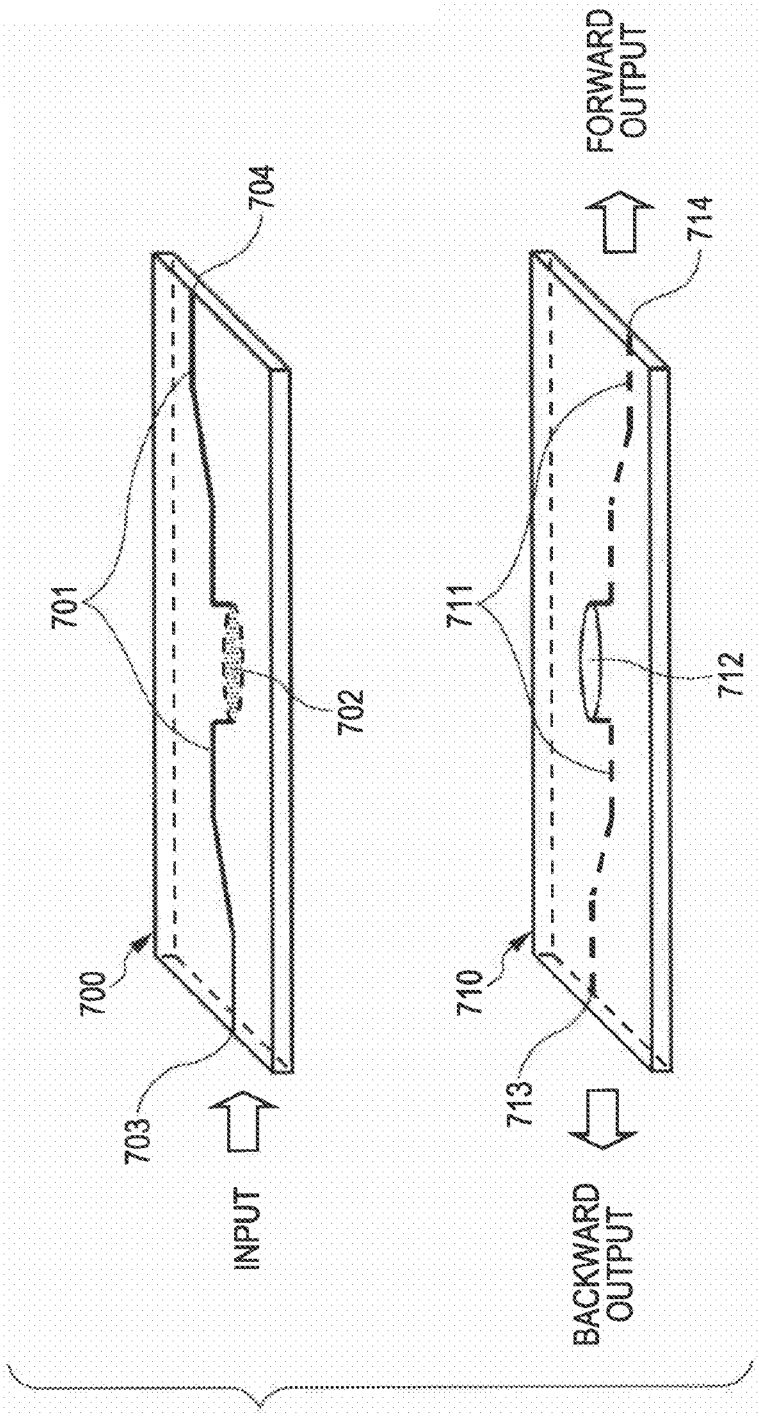
FIG. 6A is a diagram illustrating an operating result of a slot antenna having a ring-shaped slot transmission line between an antenna electrode and a grounded conductor.

FIG. 6A illustrates disposition of a transmission antenna and a receiving antenna at measurement time. A transmission antenna electrode 702 and a receiving antenna electrode 712 are both a disc having a diameter of 6.0 mm, and a width of the slot transmission line formed within the grounded conductor is set to be 0.2 mm. The design value of the characteristic impedance of the slot transmission line is 100Ω. In the prototype shown in FIG. 7A, feed lines 701 and 711 (FIG. 6A) are microstrip transmission lines having a line width of 1.6 mm, and the design value of the characteristic impedance of 50Ω. In the prototype shown in FIG. 8A, feed lines 701 and 711 are microstrip transmission lines having a line width of 0.2 mm, and the design value of the characteristic impedance of 50 Ω.

Figure 6B:
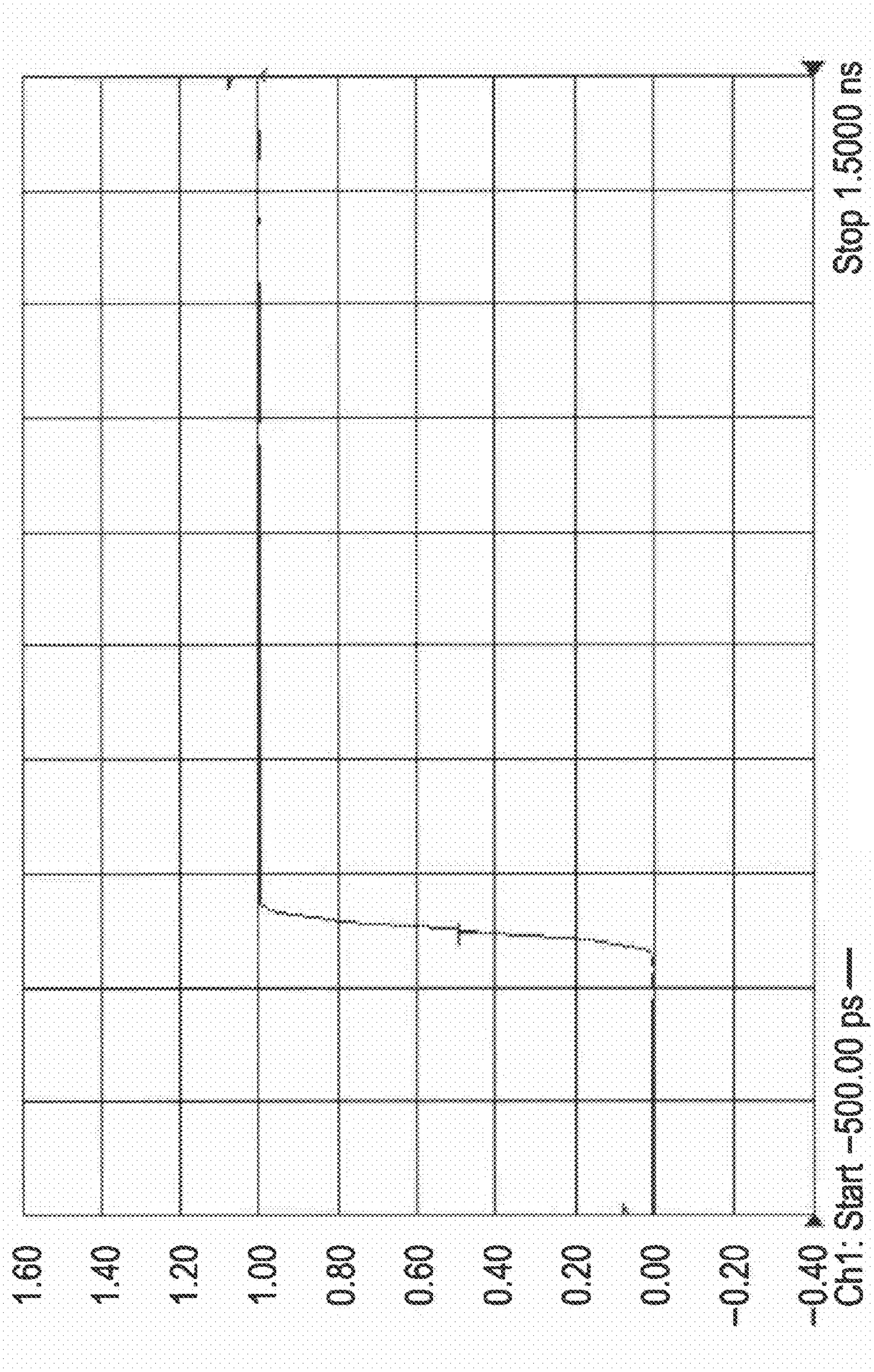
FIG. 6B is a diagram illustrating an operating result of a slot antenna having a ring-shaped slot transmission line between an antenna electrode and a grounded conductor.

As shown in FIG. 6A, a transmission antenna substrate 700 and a receiving antenna substrate 710 are disposed so that individual antenna surfaces are facing to each other 2.0 mm apart. A step waveform having a rise time of 100 picoseconds is input into an input-side port 703 of the transmission substrate, and a terminating resistor of 50Ω is connected to an output-side port 704. FIG. 6B shows an input waveform to the port 703 in FIG. 6A. Note that the horizontal axis represents time, and indicates 200 picoseconds per one division. Also, the vertical axis represents voltage, and indicates any unit.

An output from the receiving substrate 710 was taken out from one of the ports, and a terminating resistor of 50Ω was connected to the other of the ports. As described with reference to FIG. 4, when near electromagnetic field occurred from a progressive wave traveling along the slot transmission line of the transmission antenna 702 reaches the slot transmission line of the opposed receiving antenna 712, progressive waves traveling in a forward direction and in the opposite direction individually are induced by electromagnetic coupling effect. Thus, as output from the receiving substrate 710, measurements were made of a forward output taken from the port 714 and of a backward output taken from the port 713. Also, when the forward output is measured, a terminating resistor of 50Ω was connected to the port 713, and when the backward output is measured, a terminating resistor of 50Ω was connected to the port 714. A time-domain analysis function of a network analyzer was used for the measurement.

Figure 7B:
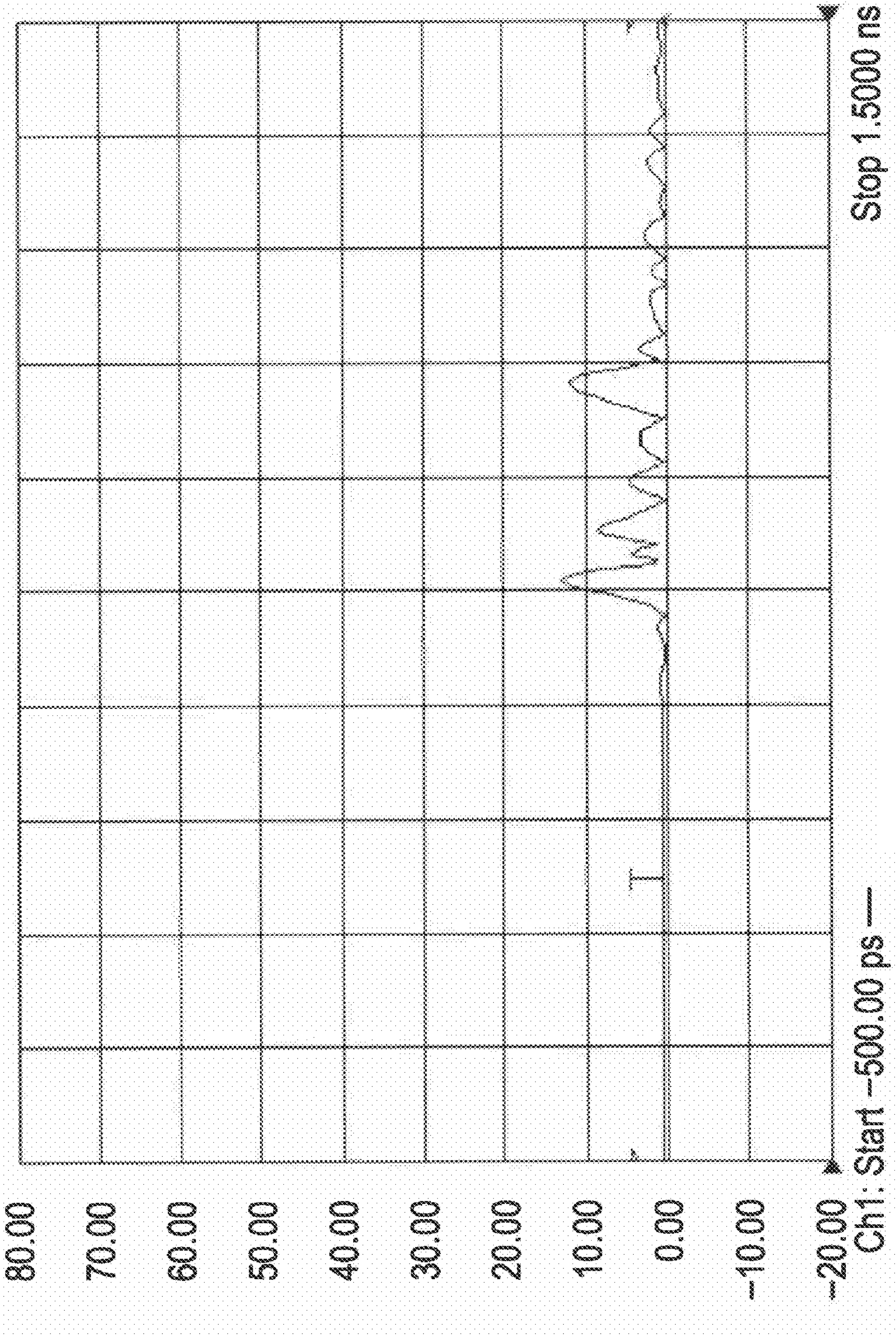
FIG. 7B is a diagram illustrating an operating result of a slot antenna having a ring-shaped slot transmission line between an antenna electrode and a grounded conductor in the prototype shown in FIG. 7A.
Figure 7C:
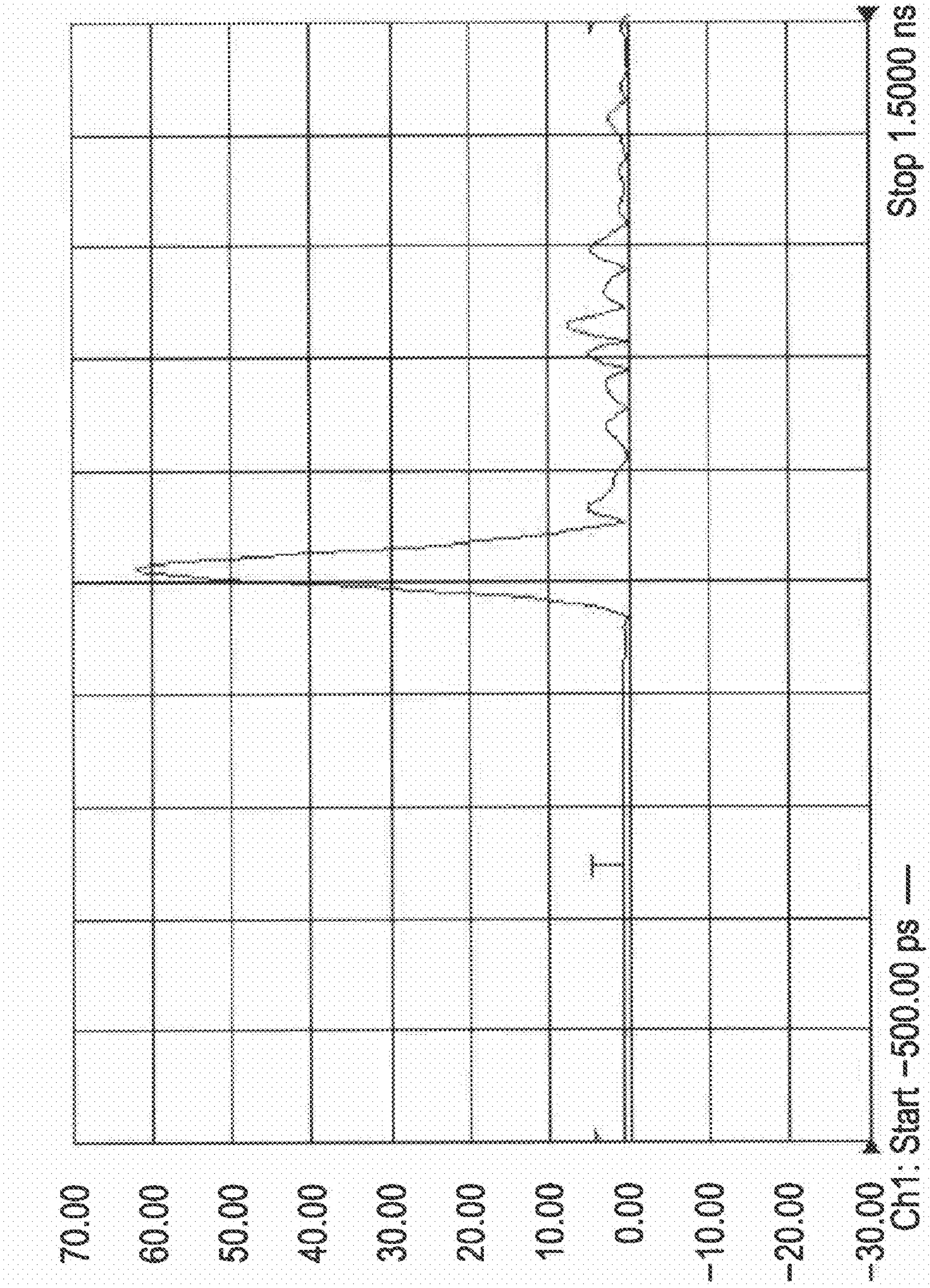
FIG. 7C is a diagram illustrating an operating result of a slot antenna having a ring-shaped slot transmission line between an antenna electrode and a grounded conductor in the prototype shown in FIG. 7A.

FIGS. 7B and 7C show a forward-output waveform and a backward-output waveform of the receiving antenna 712 in the prototype shown in FIG. 7A, respectively. Note that the horizontal axis represents time, and indicates 200 picoseconds per one division. The vertical axis represents voltage, and indicates any unit. Assuming that the amplitude of input step waveform is 1, a pulse waveform having an amplitude of about 0.062 and a time width of 200 ps or less was measured from the backward output of the receiving antenna 712. On the other hand, a waveform having only a small amplitude was measured from the forward output of the receiving antenna 712.

Figure 8B:
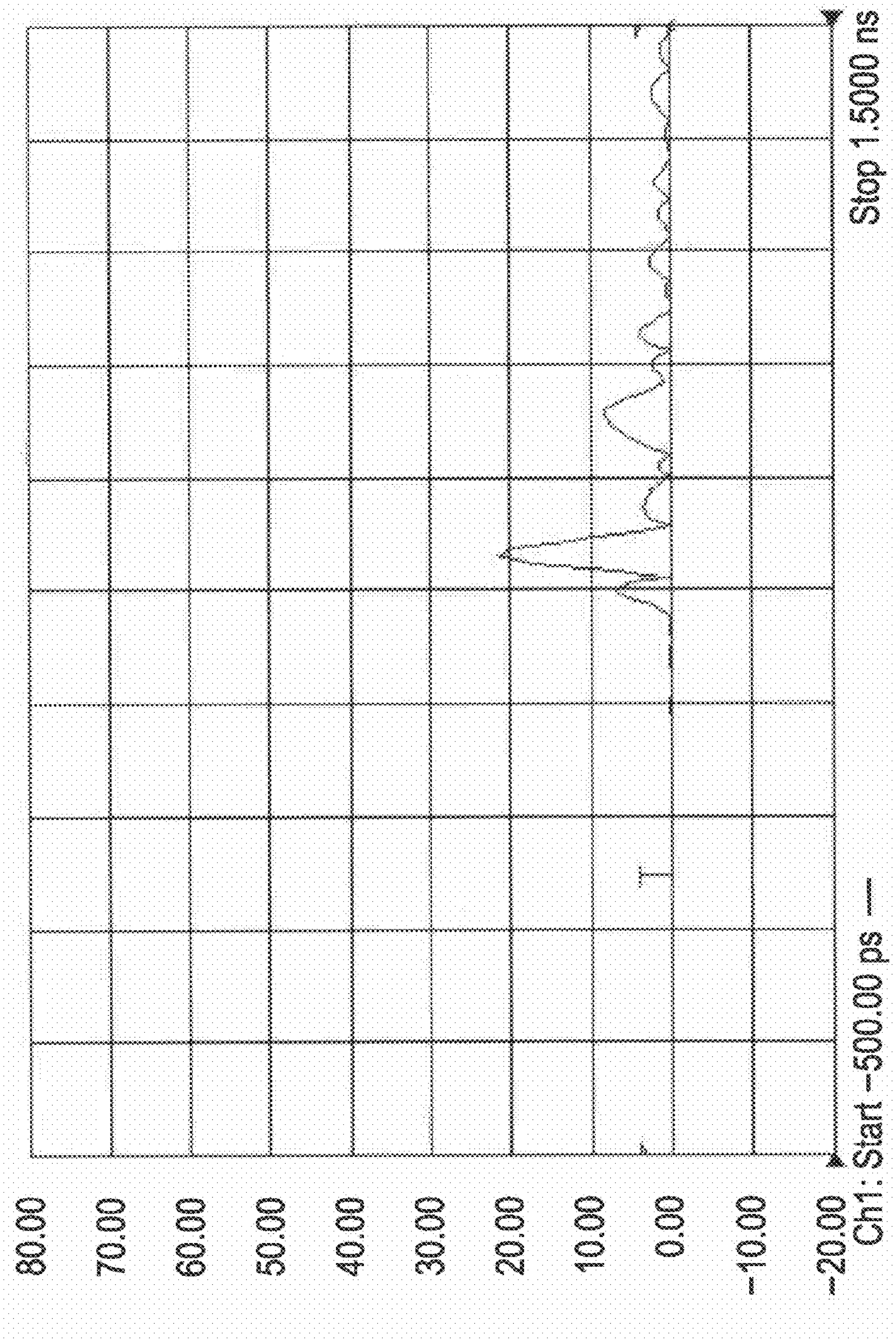
FIG. 8B is a diagram illustrating an operating result of a slot antenna having a ring-shaped slot transmission line between an antenna electrode and a grounded conductor.
Figure 8C:
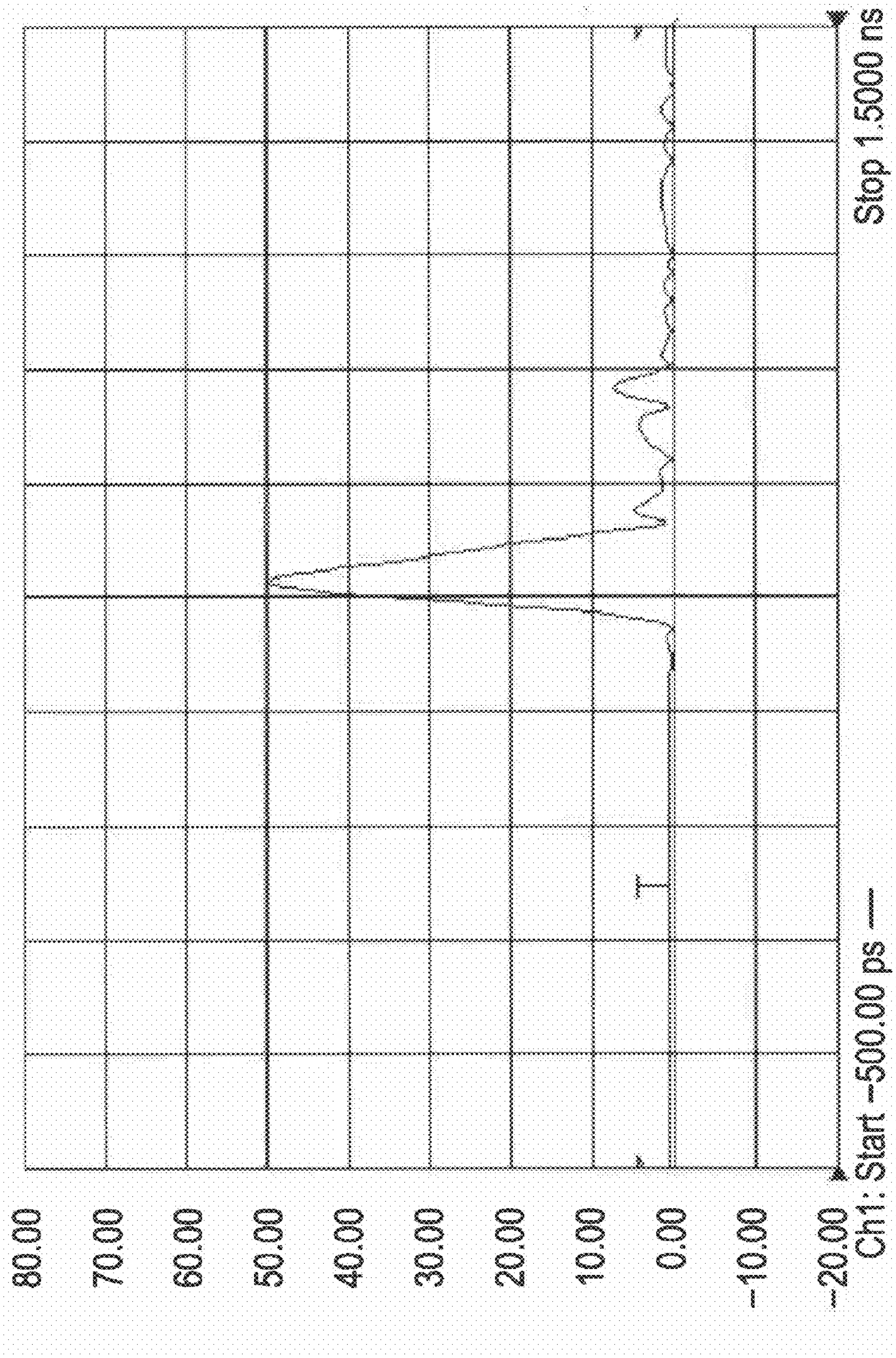
FIG. 8C is a diagram illustrating an operating result of a slot antenna having a ring-shaped slot transmission line between an antenna electrode and a grounded conductor in the prototype shown in FIG. 8A.

Also, FIGS. 8B and 8C show forward-output waveform and a backward-output waveform of the receiving antenna 712 in the prototype shown in the image of FIG. 8A, respectively. Note that the horizontal axis represents time, and indicates 200 picoseconds per one division. The vertical axis represents voltage, and indicates any unit. Also, in this case, assuming that the amplitude of input step waveform is 1, a pulse waveform having an amplitude of about 0.050 and a time width of 200 ps or less was measured from the backward output of the receiving antenna 712. On the other hand, a waveform having only a small amplitude was measured from the forward output of the receiving antenna 712.

These results proves that the antenna has a sufficiently good characteristic for achieving a transfer rate of about 5 Gbps both in the case of using a double-sided substrate and in the case of multi-layer substrate of three layers or more, and thus demonstrates the operation of an antenna provided by the present invention.

In a communication system according to the present invention, a transmission line having a substantially broadband characteristic itself is used as a non-contact data transfer antenna, and a digital baseband signal is directly transmitted. Such a concept of the present invention can be applied not only to a single-ended transmission, but also to a differential signal transmission. When a small amplitude voltage is used in order to achieve high-speed signal transmission, it is advantageously possible to restrain influence of noise by the differential signal transmission.

Figure 9:
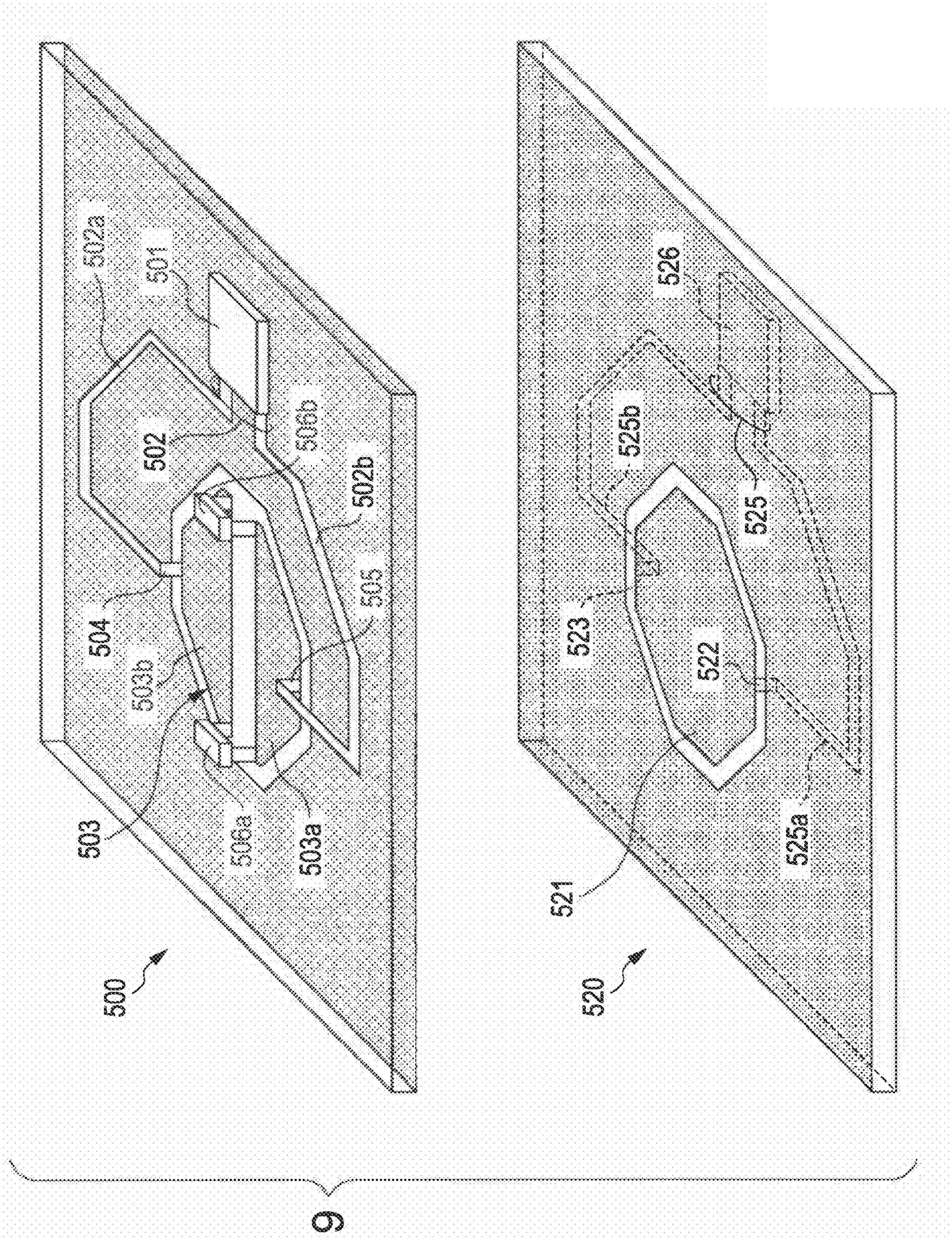
FIG. 9 is a diagram illustrating an example of a configuration of a communication system according to another embodiment of the present invention.

FIG. 9 illustrates an example of a configuration of a communication system according to another embodiment of the present invention. A transmission substrate 500 and a receiving substrate 520 are disposed in proximity. Both the transmission substrate 500 and the receiving substrate 520 are dielectric substrates having one of surfaces on which a slot antenna including a conductor layer and a ring-shaped slot is formed, and the other of the surfaces on which a circuit component, such as a transmission IC 501 or a receiving IC 526, etc., is mounted. In the same manner as the communication system shown in FIG. 1, the communication system performs digital data transfer, but differs in the point that differential transmission is performed.

First, a description will be given of a transmitter. In the communication system shown in FIG. 1, the slot antenna 103 includes a ring-shaped slot transmission line formed between an antenna electrode and grounded conductor. Two feed points 107 and 108 are disposed about the center of the slot antenna. In contrast, in the embodiment shown in FIG. 9, an antenna electrode 503 separated by the slot transmission line is disposed at a substantially central part of the grounded conductor in common with the former system. However, one of the surfaces of the transmission substrate 500 is provided with two antenna electrodes 503*a* and 503*b*, which is divided substantially along a line perpendicular to a line connecting two feed points 504 and 505 disposed sandwiching the center of the slot antenna. The antenna electrodes 503*a* and 503*b* are connected at both ends of the gap dividing the individual electrodes 503*a* and 503*b* by terminating resistors 506*a* and 506*b*.

Figure 10:
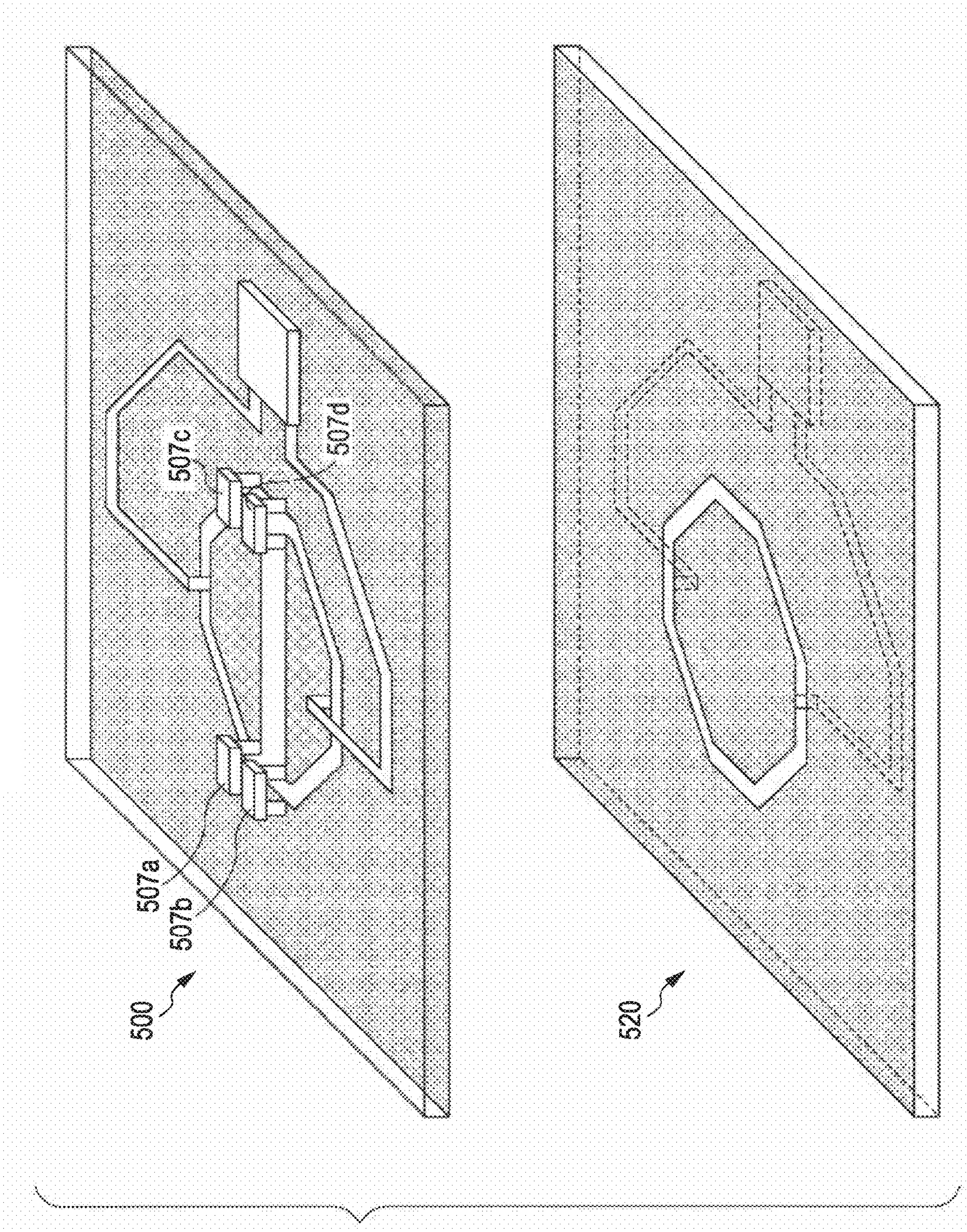
FIG. 10 is a diagram illustrating a variation of a transmission substrate of the communication system shown in FIG. 9.

In this regard, a method of terminating the individual electrodes 503*a* and 503*b* is not limited to that shown in FIG. 9. For example, as shown in FIG. 10, there is considered a variation in which terminating resistors 507*a*, 507*b*, 507*c*, and 507*d* are disposed between the antenna electrode and the grounded conductor or between the power source terminal. Similarly labeled elements in FIG. 9 and FIG. 10 correspond with common elements.

Also, as shown in FIG. 9 the circuit component, such as the transmission IC 501 is mounted on the other of the surfaces of the transmission substrate 500. The transmission IC 501 outputs the digital baseband signal on two-branched differential transmission lines 502*a* and 502*b* (shown by a differential pair 502) as a differential electronic signal, such as LVDS, CML, etc. The individual differential transmission lines 502*a* and 502*b* are made of microstrip transmission lines, and are connected to individual antenna electrodes 503*a* and 503*b* at the feed points 504 and 505, respectively, through through holes.

The electronic signal output from the transmission IC 501 goes through impedance-matched microstrip transmission lines (502*a*, 502*b*), through holes, and slot transmission lines, and is mostly converted into heat at the terminating resistor. Thus, it is possible to obtain good transmission characteristic with little reflection.

Next, a description will be given of a receiver. The receiving substrate 520 includes a slot antenna 521 having a ring-shaped slot transmission line formed between an antenna electrode and the grounded conductor. Two feed points 522 and 523 are disposed sandwiching the center of the ring-shaped slot 521, and are connected to microstrip transmission lines 525*a* and 525*b* on the other of the surfaces through through holes, respectively. The two microstrip transmission lines 525*a* and 525*b* meet near the antenna, and are connected to the receiving IC 526 as a differential transmission line 525.

Figure 11A:
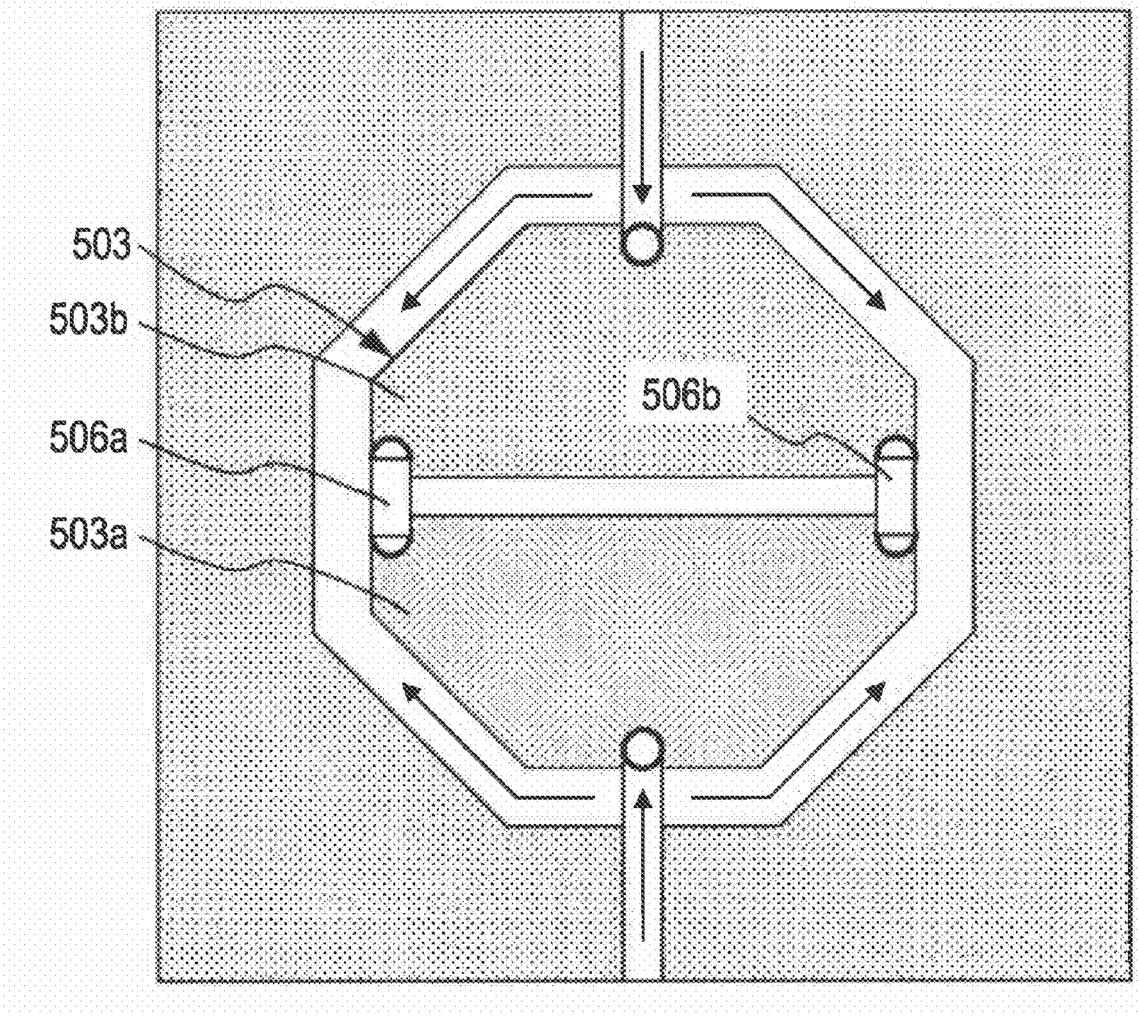
FIG. 11A is a diagram illustrating a state of a progressive wave traveling in a transmission antenna in the communication system shown in FIG. 9.
Figure 11B:
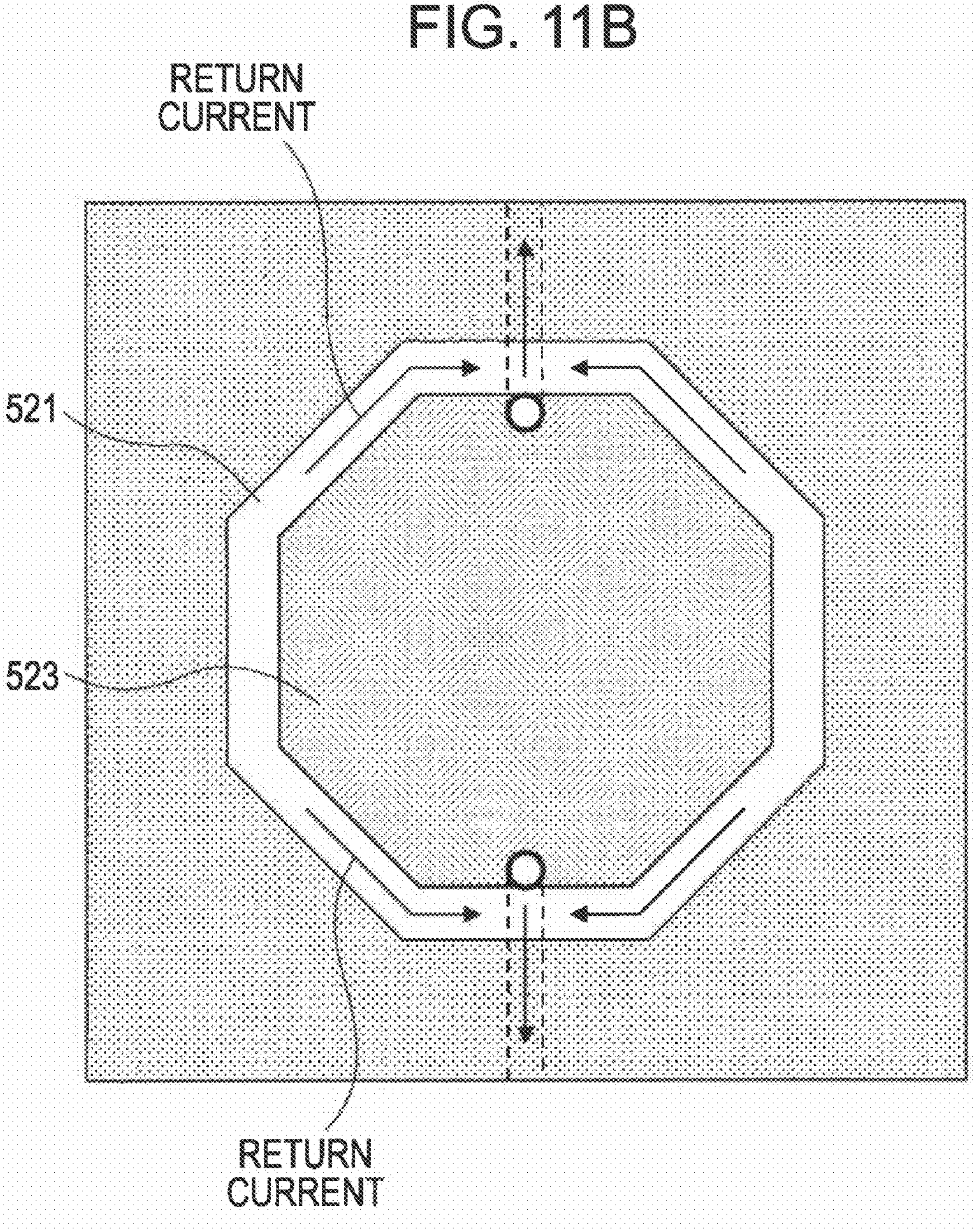
FIG. 11B is a diagram illustrating a state of a progressive wave traveling in a receiving antenna in the communication system shown in FIG. 9.
Figure 12A:
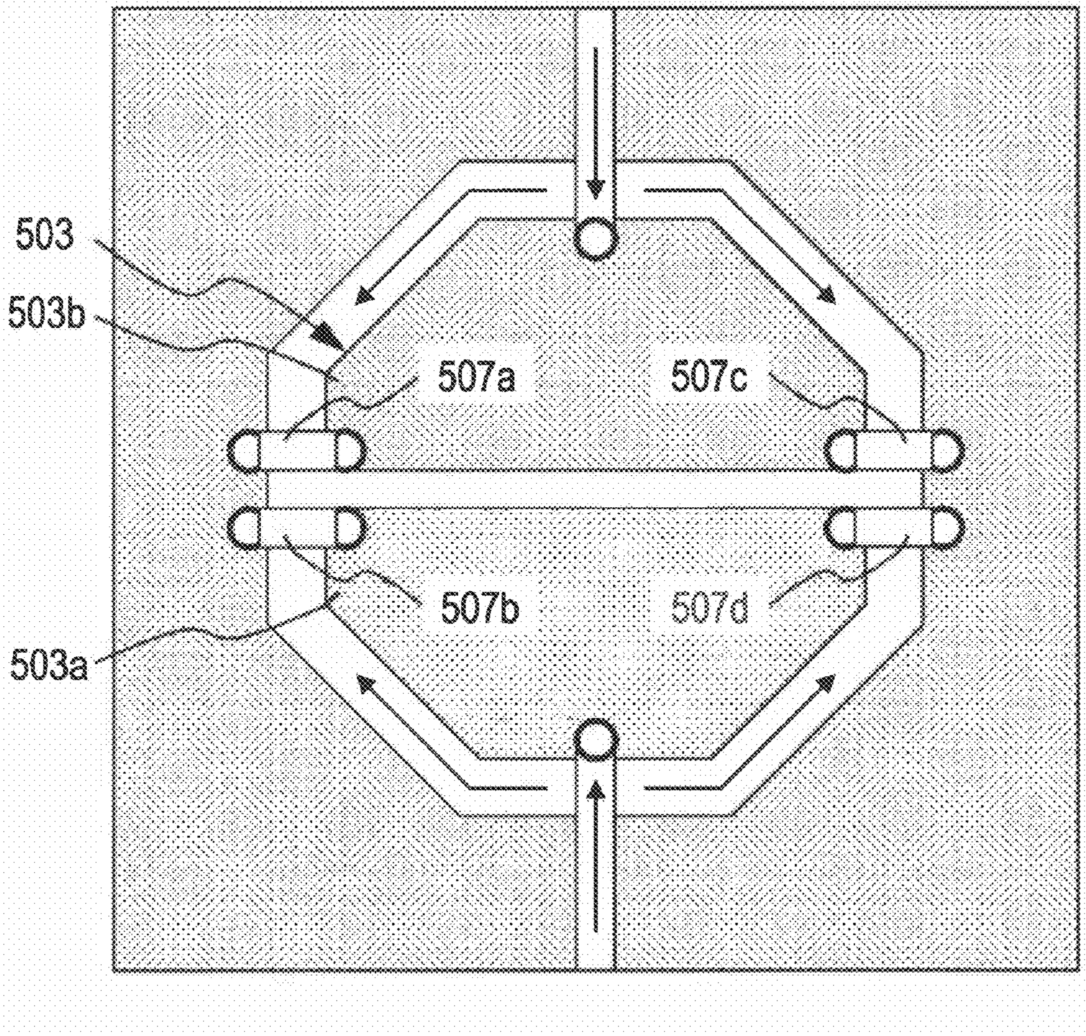
FIG. 12A is a diagram illustrating a state of a progressive wave traveling in a transmission antenna in the communication system shown in FIG. 10.

FIGS. 11A and 11B illustrate states in which a progressive wave (including return current) travels through the transmission antenna and the receiving antenna in the communication system shown in FIG. 9, respectively. Also, FIGS. 12A and 12B illustrate states in which a progressive wave travels (including a return current) through a transmission antenna and a receiving antenna in the communication system shown in FIG. 10, respectively.

The individual differential transmission lines 502*a* and 502*b*, which are made of microstrip transmission lines, are connected to individual antenna electrodes 503*a* and 503*b* at the feed points 504 (FIG. 9) and 505, respectively, through through holes. Accordingly, a quasi-TEM wave flowing into the differential transmission line 502*a* is converted into two progressive waves of $TE_{10}$-mode which are traveling in the opposite directions with each other, at the feed point 504. In the same manner, a quasi-TEM wave flowing into the differential transmission line 502*b* is converted into two progressive waves of $TE_{10}$-mode which are traveling in the opposite directions with each other, at the feed point 505. After that, two pairs of the progressive waves traveling in the opposite directions with each other with the individual feed points 504 and 505 as respective branch points are terminated at individual ends of the antenna electrodes 503*a* and 503*b* through terminating resistors 506*a*, 506*b* or terminating resistors 507*a*, 507*b*. That is to say, the electronic signal output from the transmission IC 501 goes through impedance-matched microstrip transmission lines (502*a*, 502*b*), through holes, and slot transmission lines, and is mostly converted into heat at the terminating resistor. Thus, it is possible to obtain good transmission characteristic with a reduced amount of reflection (described above).

The progressive waves that flowed from the individual differential transmission lines 502*a* and 502*b* to the feed points 504 and 505 branch and travel toward the terminating resistors 506*a*, 506*b* or 507*a*, 507*b*, 507*c*, and 507*d* as shown in FIG. 10. In this manner, as shown in FIGS. 11A and 12A, when a progressive wave travels along the slot transmission line of the transmission antenna, in the same manner as the example shown in FIG. 4, an electric field substantially concentrically surrounding the slot transmission line occurs. When the near electric field and the near magnetic field leaked out from the two pairs of the progressive waves traveling along the slot transmission line of the transmission antenna reaches the slot transmission line 521 of the receiving antenna, a pair of progressive waves traveling on the slot transmission line 521 in a forward direction and in the opposite direction with respect to the progressive waves are induced by electromagnetic coupling effect. Compared with the amplitude of a progressive wave traveled in the forward direction, the amplitude of a progressive wave traveled in the backward direction, that is to say, a return current, becomes large and dominant (described above).

Figure 12B:
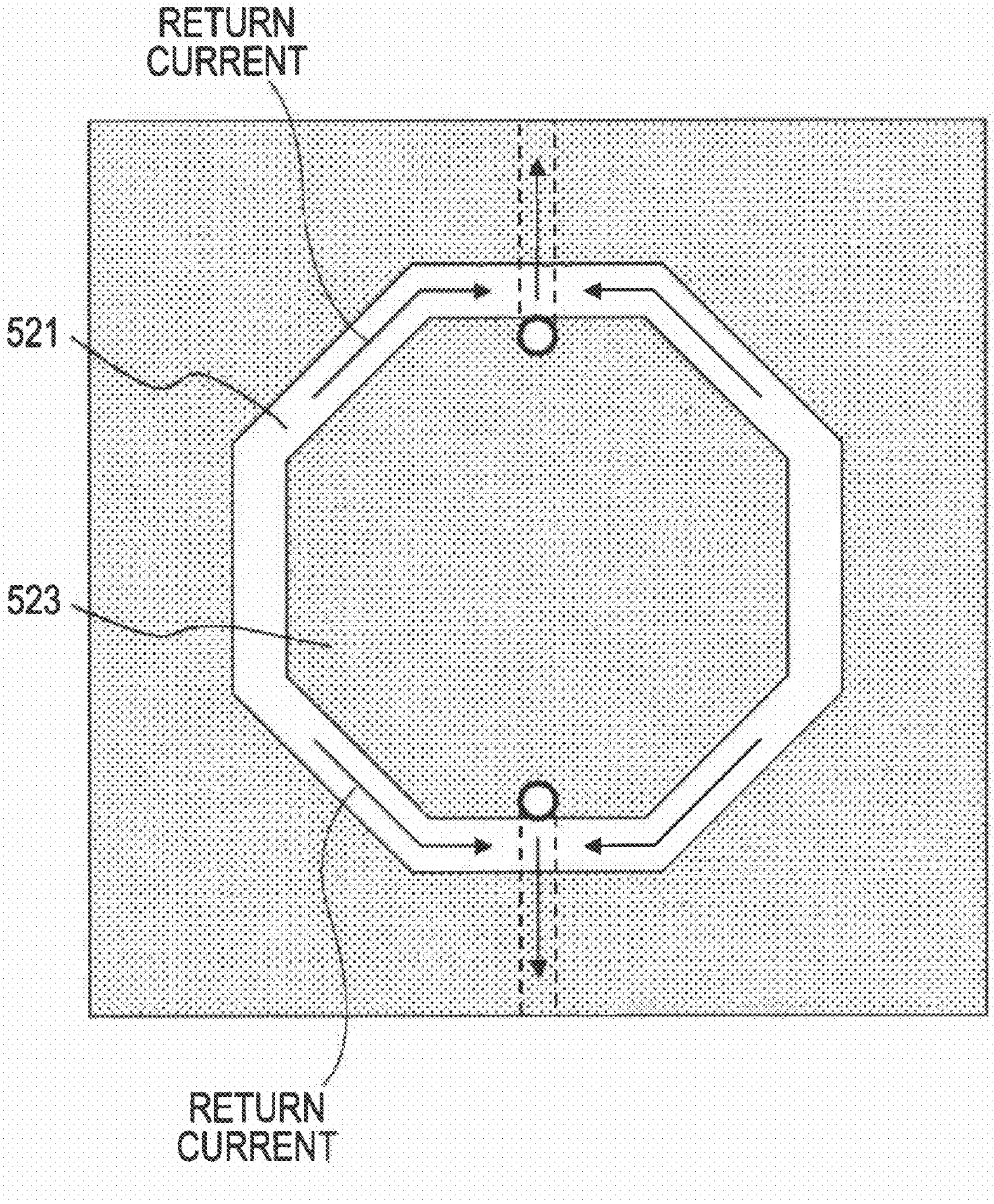
FIG. 12B is a diagram illustrating a state of a progressive wave traveling in a receiving antenna in the communication system shown in FIG. 10.

As shown in FIGS. 11B and 12B, the two pair of return currents induced on the slot transmission line 521 are combined into one pair of differential signals at the individual feed points 522 and 523, respectively. The differential signals reach the receiving IC 526 through the through holes, the microstrip transmission lines 525*a* and 525*b*. The receiving antenna is not provided with a terminating resistor, and thus the power of the receive signal is not lost as heat. Accordingly, it is possible to achieve good receiving sensitivity.

In the communication system according to the present invention, an antenna apparatus having a ring-shaped slot transmission line between an antenna electrode and a grounded conductor is used as a transmission and a receiving antennas. There is an advantage in that a digital baseband signal can be directly transmitted using a transmission line itself having a broadband characteristic as a non-contact data transfer antenna. On the other hand, the slot antenna itself is common knowledge for those skilled in the art. Finally, a description will be given of the difference between the slot antenna and the antenna apparatus used in the present invention.

In general, an infinite conducting plate which is provided with a cutaway having a length L and a width of W (L>>W) and of which smaller-width sides of the slot are connected to a high-frequency power source is referred to a slot antenna, which has a complementary relationship with a dipole antenna. Such a slot antenna resonates at a certain specific frequency which is determined by the length L, and operates so as to send out a plane wave or receive the wave (for example, refer to Written by Arai Hiroyuki, "New Antenna Engineering—Antenna Technology for Mobile Communication Era—" Sogo Denshi Shuppan Sha, Sep. 10 2001, Third Edition, Pages: 55-57).

Also, several proposals have been already made of a slot antenna produced by providing a conductor plate with a ring-shaped slot. The slot antenna is mainly used for sending out and receiving a circularly polarized wave of a specific frequency (narrow band) (for example, refer to Japanese Patent Nos. 2646273 and 3247140). In these antennas, a circular slot line is provided with a feed point and a perturbation element, a stationary wave is produced with respect to a $TE_{10}$ wave having a frequency such that a half wavelength is equal to the slot line length from the feed point to the perturbation element in the clock-wise or the counter-clock wise direction as viewed from the feed point. The electric field component of the stationary wave and the electric field component of a counter-clockwise circularly polarized wave or a clockwise circularly polarized wave are converted into a plane wave to be transmitted or received as a radio wave. Accordingly, a ring-shaped slot antenna of this kind has a resonant narrow-band characteristic.

In contrast, in a communication system according to the present invention, two slot antennas are disposed with being opposed in proximity, and coupling is directly performed between a near electric field component and a near magnetic field component of a $TE_{10}$ wave traveling along the slot transmission line of the transmission antenna. This is different from a resonant antenna. Here, two feed points are disposed about the center of the ring-shaped slot. A length of the slot line between the feed points is substantially equal in the clockwise direction and in the counterclockwise direction, and thus the slot line plays an equal role for signal transmission between the transmission antenna and the receiving antenna. Also, there is less impedance mismatch in the connection of the slot transmission line with the microstrip transmission line through a through hole, and thus resulting in a reduced amount of reflection. Accordingly, it is possible to prevent the occurrence of a stationary wave, and thus it is possible to have a broadband characteristic.

Accordingly, by a communication system according to the present invention, it becomes possible to directly transfer a digital baseband signal in proximity without contact using a pulse signal including broadband frequency components. Thus, it becomes possible to easily provide overwhelmingly faster transmission compared with related-art communication methods using modulation and demodulation.

The present application contains subject matter related to that disclosed in Japanese Priority Patent Application JP 2008-118412 filed in the Japan Patent Office on Apr. 30, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An antenna apparatus for use in a transmitter or a receiver in a communication system, the antenna apparatus comprising:

a dielectric substrate having a conductor layer on one surface thereof; and a slot antenna including an antenna electrode formed from the conductor layer on the one surface, a grounded conductive surface formed from the conductor layer on the one surface to surround the antenna electrode, and a slot transmission line formed as a gap between the antenna electrode and the grounded conductive surface, the slot antenna further including two feed points of the slot transmission line, one of the two feed points coupling the slot transmission line to ground via a resistor.

2. The antenna apparatus according to claim 1, wherein the antenna electrode surrounded by the grounded conductive surface is formed in a shape of a circle or a polygon.

3. The antenna apparatus according to claim 1, wherein the two feed points are disposed on opposite sides of a center of the slot transmission line.

4. The antenna apparatus according to claim 3, wherein the slot transmission line is connected to an other surface of the dielectric substrate via a through hole at each of the feed points, and is coupled to a transmission circuit chip or a receiving circuit chip mounted on the other surface via a microstrip transmission line.

5. The antenna apparatus according to claim 4, wherein an impedance mismatch is small between the slot transmission line and the microstrip transmission line via the through hole.

6. The antenna apparatus according to claim 5, wherein the slot transmission line includes two slot transmission lines and a ratio of a characteristic impedance of the two slot transmission lines connected in parallel between the two feed points and a characteristic impedance of the microstrip transmission line is set to about 2:1.

7. The antenna apparatus according to claim 6, wherein the characteristic impedance of the two slot transmission lines is matched in a vicinity of a center frequency of frequency bands to be used.

8. The antenna apparatus according to claim 7, wherein the antenna apparatus is used for a transmission antenna of the transmission circuit chip, and the transmission circuit chip directly supplies a high-speed digital baseband signal to at least one of the feed points as a transmission signal.

9. The antenna apparatus according to claim 7, wherein the antenna apparatus is used for a receiving antenna of the receiving circuit chip, and when receiving a transmission signal from a transmitter including the antenna apparatus, the receiving circuit chip extracts a receiving signal flowing in a direction opposite to a traveling direction of a progressive wave input into the slot transmission line of the transmission antenna.

10. The antenna apparatus according to claim 3, wherein the dielectric substrate comprises a three-layer substrate or a four-layer substrate.

11. The antenna apparatus according to claim 10, wherein an internal layer of the three-layer or four-layer substrate is an internal grounded conductor surface, and a part of the internal grounded conductor surface that overlaps the antenna electrode and a microstrip transmission line is cut away.

12. The antenna apparatus according to claim 10, wherein an internal layer of the three-layer or four-layer substrate is an internal grounded conductor surface, and the internal grounded conductor surface comprises a sufficiently large opening formed at a part of the internal grounded conductor surface that overlaps with the antenna electrode.

13. The antenna apparatus according to claim 3, wherein the antenna apparatus is used for a transmission antenna of a transmitter, the antenna electrode is divided substantially into two parts along a line perpendicular to a line connecting the two feed points to form antenna electrodes, each of the two parts of the antenna electrodes are terminated at respective ones of the two feed points at end parts thereof, and a differential signal is supplied to the two feed points of each of the antenna electrodes.

14. The antenna apparatus according to claim 3, wherein the antenna apparatus is used for a receiving antenna of a receiver, and a differential signal is received from the two feed points disposed on the antenna electrode.

15. A communication system comprising:

a transmission slot antenna having a ring-shaped slot transmission line between an antenna electrode and a grounded conductor surface at a transmitter side; and a receiving slot antenna having a ring-shaped slot transmission line between an antenna electrode and a grounded conductor surface at a receiver side, wherein the transmission slot antenna and the receiving slot antenna are disposed in proximity, and data transmission is performed using a near-field electromagnetic coupling effect produced between the slot transmission lines of the transmission slot antenna and the receiving slot antenna, and the transmission slot antenna further including two feed points of the slot transmission line, one of the two feed points coupling the slot transmission line to ground via a resistor.

16. The communication system according to claim 15, wherein data transmission is performed by coupling a near electric field component or a near magnetic field component of a wave traveling along the slot transmission line of the transmission slot antenna and the slot transmission line of the receiving slot antenna.

* * * * *